US012601586B2

(12) United States Patent
Tanaka et al.

(10) Patent No.: US 12,601,586 B2
(45) Date of Patent: Apr. 14, 2026

(54) FLOOR SURFACE CONDITION DETECTION DEVICE, DISTANCE MEASURING DEVICE EQUIPPED WITH SAME, FLOOR SURFACE CONDITION DETECTION METHOD, AND FLOOR SURFACE CONDITION DETECTION PROGRAM

(71) Applicant: OMRON CORPORATION, Kyoto (JP)

(72) Inventors: Hiroyuki Tanaka, Kyoto (JP); Hideki Chujo, Kyoto (JP); Masahiro Kinoshita, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 968 days.

(21) Appl. No.: 17/700,586

(22) Filed: Mar. 22, 2022

(65) Prior Publication Data

US 2022/0316866 A1     Oct. 6, 2022

(30) Foreign Application Priority Data

Apr. 6, 2021     (JP) ................................. 2021-064637

(51) Int. Cl.
*G01B 11/24*          (2006.01)
*G01B 11/06*          (2006.01)
(Continued)

(52) U.S. Cl.
CPC .............. *G01B 11/24* (2013.01); *G01S 17/89* (2013.01); *G01B 11/0608* (2013.01); *G01B 21/042* (2013.01); *G01S 17/894* (2020.01)

(58) Field of Classification Search
CPC .. G01B 11/24; G01B 21/042; G01B 11/0608; G01S 17/89; G01S 17/894
See application file for complete search history.

(56) References Cited

U.S. PATENT DOCUMENTS 10,896,499 B2     1/2021   Kato
11,138,750 B2    10/2021   Lee et al.
(Continued)

FOREIGN PATENT DOCUMENTS

CN       104704385 A       6/2015
CN       106395528 A       2/2017
(Continued)

OTHER PUBLICATIONS

Chinese Office Action issued on Feb. 28, 2025 in a related Chinese patent application No. 202210348328.7.
(Continued)

*Primary Examiner* — Catherine T. Rastovski
*Assistant Examiner* — Christian T Bryant
(74) *Attorney, Agent, or Firm* — METROLEX IP LAW GROUP, PLLC; Robert L. Scott, Esq.

(57)          ABSTRACT
A control unit (10) is a device for detecting the condition of a floor surface (FL) on which a target (30) has been placed, and comprises a distance calculation unit (11) and a target detection unit (18). The distance calculation unit (11) calculates information about the distance to the target (30) according to the amount of reflection of the light emitted from a lighting device (21) toward the target (30). The target detection unit (18) detects the condition of a floor surface (FL) on which the target (30) has been placed, on the basis of the information about the distance acquired by the distance calculation unit (11).

7 Claims, 16 Drawing Sheets

(51) Int. Cl.

| | | |
|---|---|---|
| *G01B 21/04* | (2006.01) | |
| *G01S 17/89* | (2020.01) | |
| *G01S 17/894* | (2020.01) | |

(56) References Cited

U.S. PATENT DOCUMENTS

| | | | | |
|---|---|---|---|---|
| 11,341,771 | B2 | 5/2022 | Ono | |
| 11,977,156 | B2 | 5/2024 | Kimura et al. | |
| 2008/0094607 | A1 | 4/2008 | Bernard et al. | |
| 2014/0314278 | A1* | 10/2014 | Tatsuzawa | G06T 7/11 |
| | | | | 382/103 |
| 2015/0362921 | A1* | 12/2015 | Hanaoka | G05D 1/0274 |
| | | | | 702/159 |
| 2016/0292514 | A1 | 10/2016 | Robinson et al. | |
| 2017/0112355 | A1 | 4/2017 | Hirota et al. | |
| 2017/0228602 | A1* | 8/2017 | Stefanovic | G01B 11/14 |
| 2018/0149753 | A1 | 5/2018 | Shin et al. | |
| 2019/0287236 | A1 | 9/2019 | Kato | |
| 2020/0118283 | A1 | 4/2020 | Lee et al. | |
| 2020/0379111 | A1 | 12/2020 | Kimura et al. | |
| 2021/0026368 | A1* | 1/2021 | Cochran | G05D 1/00 |
| 2021/0033394 | A1* | 2/2021 | Sasaki | G01C 3/06 |
| 2021/0334517 | A1 | 10/2021 | Ono | |
| 2021/0335000 | A1 | 10/2021 | Kanetaka et al. | |
| 2022/0146678 | A1 | 5/2022 | Chujo et al. | |
| 2022/0280009 | A1 | 9/2022 | Tan et al. | |
| 2023/0273012 | A1 | 8/2023 | Okada | |

FOREIGN PATENT DOCUMENTS

| | | | |
|---|---|---|---|
| CN | 106488735 | A | 3/2017 |
| CN | 109684907 | A | 4/2019 |
| CN | 110278384 | A | 9/2019 |
| CN | 111742241 | A | 10/2020 |
| JP | 2003-109128 | A | 4/2003 |
| JP | 2006-260105 | A | 9/2006 |
| JP | 2014-074615 | A | 4/2014 |
| JP | 2014-085940 | A | 5/2014 |
| JP | 2014-089547 | A | 5/2014 |
| JP | 2017-122690 | A | 7/2017 |
| JP | 2019-100985 | A | 6/2019 |
| JP | 2020-112981 | A | 7/2020 |
| KR | 20200040374 | A | 4/2020 |
| WO | 2013/047083 | A1 | 4/2013 |
| WO | 2020/189071 | A1 | 9/2020 |
| WO | 2021/036072 | A1 | 3/2021 |

OTHER PUBLICATIONS

Japanese Office Action mailed on Oct. 8, 2024 in a related Japanese patent application No. 2021-064639.

Japanese Office Action mailed on Oct. 22, 2024 in a counterpart Japanese patent application No. 2021-064637.

An Office Action (USOA) issued on Apr. 17, 2025 in a related U.S. Appl. No. 17/695,877.

A Chinese Office Action issued on Mar. 29, 2025 in a counterpart Chinese patent application No. 202210348952.7.

Chinese Office Action issued on Jan. 5, 2026 in a related Chinese patent application No. 202210348328.7.

Tang Hao Kui et al., "An Adjustment of Vehicle License's Gradient", Journal of University of Jinan, Jul. 2007, p. 246-248, vol. 21, No. 3., China. Relevance is indicated in the related Chinese Office Action issued on Jan. 5, 2026.

Ryan J. Balla et al., "Nanoscale Intelligent Imaging Based on Real-Time Analysis of Approach Curve by Scanning Electrochemical Microscopy", Author Manuscript, Aug. 2019, p. 1-23, United States. Relevance is indicated in the related Chinese Office Action issued on Jan. 5, 2026.

Chinese Office Action issued on Dec. 24, 2025 in a counterpart Chinese patent application No. 202210348952.7.

* cited by examiner

CONTROL UNIT

DISTANCE CALCULATION UNIT — 11

ANGLE INFORMATION ACQUISITION UNIT — 12

THREE-DIMENSIONAL COORDINATE CONVERSION UNIT — 13

PLANE DETECTION UNIT — 14

HEIGHT CALCULATION UNIT — 15

COORDINATE ROTATION CALCULATION UNIT — 16

THRESHOLD SETTING UNIT — 17

TARGET DETECTION UNIT — 18

OUTPUT INFORMATION SELECTION UNIT — 19

10

ORTHOGONAL COORDINATE
ROTATION FORMAT

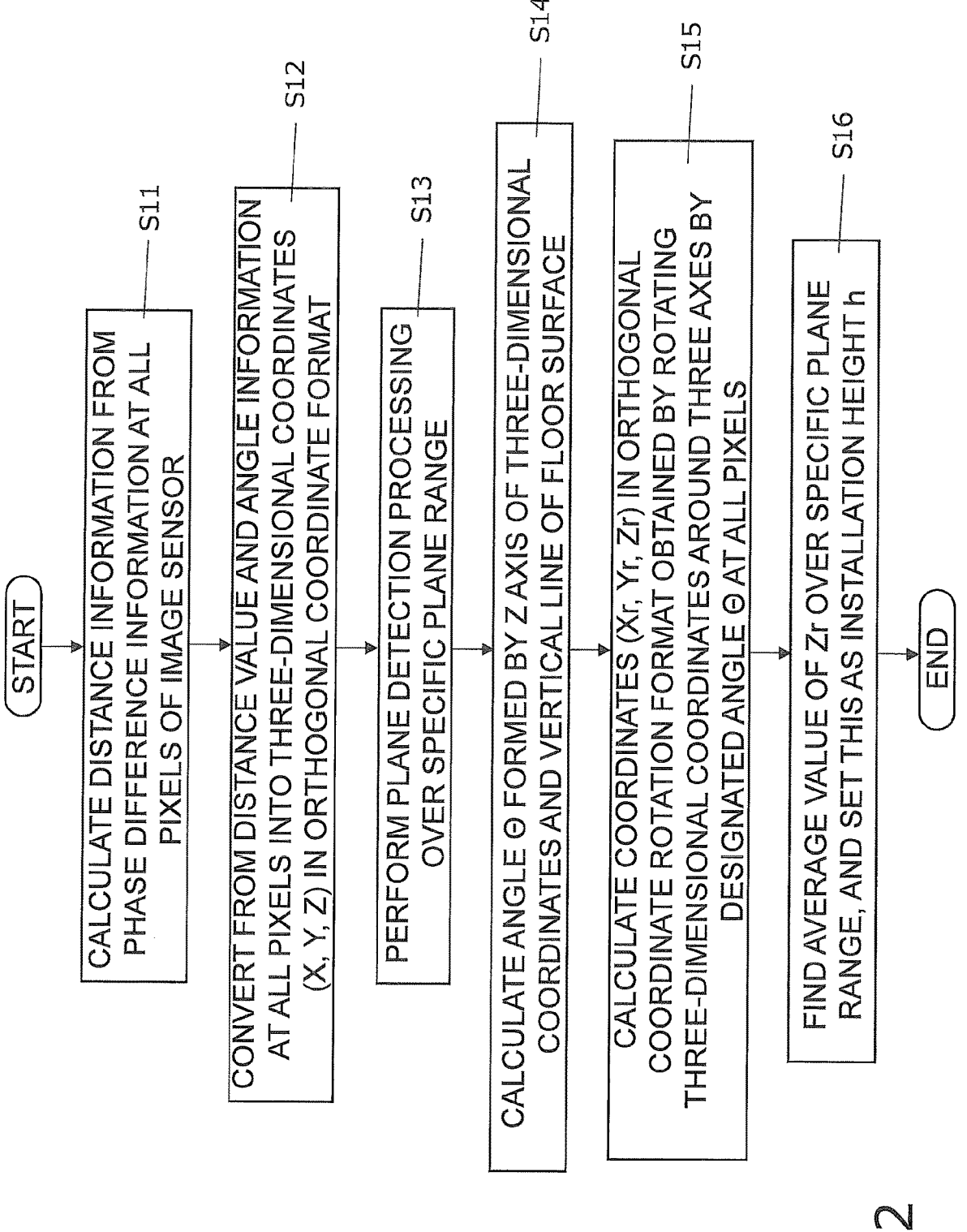

FIG. 12

START

CALCULATE DISTANCE INFORMATION FROM PHASE DIFFERENCE INFORMATION AT ALL PIXELS OF IMAGE SENSOR — S11

CONVERT FROM DISTANCE VALUE AND ANGLE INFORMATION AT ALL PIXELS INTO THREE-DIMENSIONAL COORDINATES (X, Y, Z) IN ORTHOGONAL COORDINATE FORMAT — S12

PERFORM PLANE DETECTION PROCESSING OVER SPECIFIC PLANE RANGE — S13

CALCULATE ANGLE Θ FORMED BY Z AXIS OF THREE-DIMENSIONAL COORDINATES AND VERTICAL LINE OF FLOOR SURFACE — S14

CALCULATE COORDINATES (Xr, Yr, Zr) IN ORTHOGONAL COORDINATE ROTATION FORMAT OBTAINED BY ROTATING THREE-DIMENSIONAL COORDINATES AROUND THREE AXES BY DESIGNATED ANGLE Θ AT ALL PIXELS — S15

FIND AVERAGE VALUE OF Zr OVER SPECIFIC PLANE RANGE, AND SET THIS AS INSTALLATION HEIGHT h — S16

END

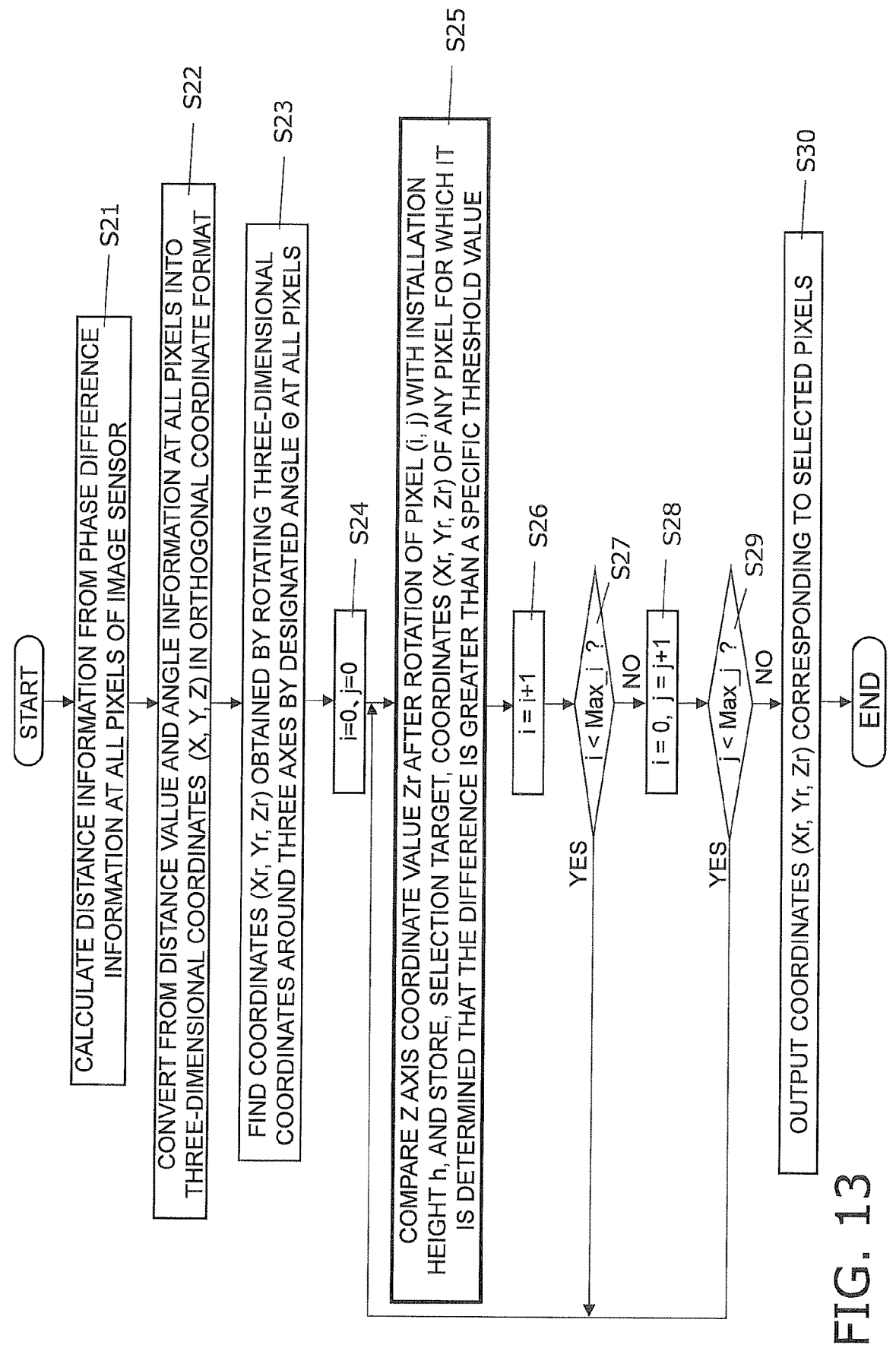

FIG. 13

START

CALCULATE DISTANCE INFORMATION FROM PHASE DIFFERENCE INFORMATION AT ALL PIXELS OF IMAGE SENSOR — S21

CONVERT FROM DISTANCE VALUE AND ANGLE INFORMATION AT ALL PIXELS INTO THREE-DIMENSIONAL COORDINATES (X, Y, Z) IN ORTHOGONAL COORDINATE FORMAT — S22

FIND COORDINATES (Xr, Yr, Zr) OBTAINED BY ROTATING THREE-DIMENSIONAL COORDINATES AROUND THREE AXES BY DESIGNATED ANGLE Θ AT ALL PIXELS — S23 i=0, j=0 — S24

COMPARE Z AXIS COORDINATE VALUE Zr AFTER ROTATION OF PIXEL (i, j) WITH INSTALLATION HEIGHT h, AND STORE, SELECTION TARGET, COORDINATES (Xr, Yr, Zr) OF ANY PIXEL FOR WHICH IT IS DETERMINED THAT THE DIFFERENCE IS GREATER THAN A SPECIFIC THRESHOLD VALUE — S25 i = i+1 — S26 i < Max_i ? — S27

NO

YES i = 0, j = j+1 — S28 j < Max_j ? — S29

NO

YES

OUTPUT COORDINATES (Xr, Yr, Zr) CORRESPONDING TO SELECTED PIXELS — S30

END

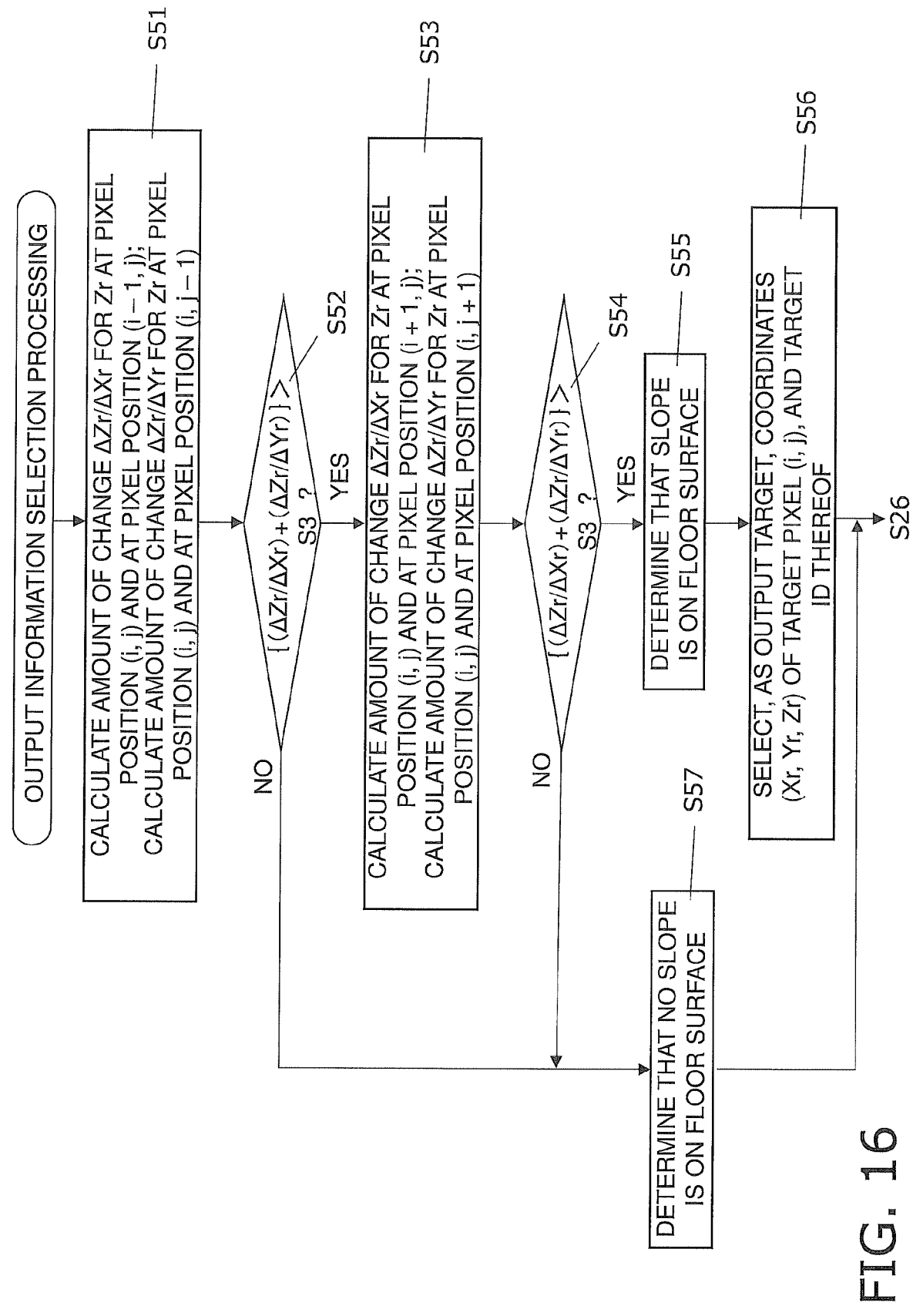

OUTPUT INFORMATION SELECTION PROCESSING

CALCULATE AMOUNT OF CHANGE ΔZr/ΔXr FOR Zr AT PIXEL POSITION (i, j) AND AT PIXEL POSITION (i−1, j); CALCULATE AMOUNT OF CHANGE ΔZr/ΔYr FOR Zr AT PIXEL POSITION (i, j) AND AT PIXEL POSITION (i, j−1)        S51

{(ΔZr/ΔXr) + (ΔZr/ΔYr)} > S3 ?        S52

NO / YES

CALCULATE AMOUNT OF CHANGE ΔZr/ΔXr FOR Zr AT PIXEL POSITION (i, j) AND AT PIXEL POSITION (i+1, j); CALCULATE AMOUNT OF CHANGE ΔZr/ΔYr FOR Zr AT PIXEL POSITION (i, j) AND AT PIXEL POSITION (i, j+1)        S53

{(ΔZr/ΔXr) + (ΔZr/ΔYr)} > S3 ?        S54

NO / YES

DETERMINE THAT SLOPE IS ON FLOOR SURFACE        S55

DETERMINE THAT NO SLOPE IS ON FLOOR SURFACE        S57

SELECT, AS OUTPUT TARGET, COORDINATES (Xr, Yr, Zr) OF TARGET PIXEL (i, j), AND TARGET ID THEREOF        S56

FLOOR SURFACE CONDITION DETECTION DEVICE, DISTANCE MEASURING DEVICE EQUIPPED WITH SAME, FLOOR SURFACE CONDITION DETECTION METHOD, AND FLOOR SURFACE CONDITION DETECTION PROGRAM

CROSS-REFERENCE TO RELATED APPLICATIONS

This application claims priority to Japanese Patent Application No. 2021-064637 filed on Apr. 6, 2021. The entire disclosure of Japanese Patent Application No. 2021-064637 is hereby incorporated herein by reference.

BACKGROUND

Technical Field

The present invention relates, for example, to a floor surface condition detection device for detecting the condition of a floor surface, such irregularities in or on the floor surface, obstacles, etc., as well as a distance measuring device comprising this floor surface condition detection device, a floor surface condition detection method, and a floor surface condition detection program.

Description of the Related Art

Recent years have seen the use of distance measuring devices that, for example, receive reflected light of the light emitted from an LED (light emitting diode; used as a light source) toward a measurement target, and use a TOF (time-of-flight) sensor, which measures the distance to a measurement target, to generate a distance image including information about the distance to the measurement target for each pixel.

For instance, Patent Literature 1 discloses a method for calibrating the coordinates of a human measurement system in which the coordinate system of a distance image obtained by a depth camera is configured as a laboratory coordinate system on the basis of data about an indoor plane portion included in the distance image.

CITATION LIST

Patent Literature

Patent Literature 1: JP-A 2017-122690

SUMMARY

However, the following problem is encountered with the above-mentioned conventional human measurement system.

That is, the above publication discloses a method for accurately analyzing human movements and postures by calibrating the coordinate system of a distance image obtained by a depth camera to a laboratory coordinate system, but does not take into account the condition of the floor surface where people are located.

For example, when a depth camera detects a person moving on the floor surface, it is extremely important to recognize the condition of the floor surface over which the person is moving.

It is an object of the present invention to provide a floor surface condition detection device with which a floor surface condition can be accurately detected, as well as a distance measuring device comprising this floor surface condition detection device, a floor surface condition detection method, and a floor surface condition detection program.

The floor surface condition detection device according to the first invention is a floor surface condition detection device that detects the state of a floor surface on which a target has been placed, and comprises a distance information acquisition unit and a condition detection unit. The distance information acquisition unit acquires information about the distance from a lighting device to the target according to the amount of reflection of the electromagnetic waves emitted toward the target. The condition detection unit detects the condition of the floor surface on which the target has been placed, on the basis of the distance information acquired by the distance information acquisition unit.

Here, for example, reflected light of the light emitted from an LED (light emitting diode; used as a light source) toward a target is received, and information about the distance to the target, which is acquired from a TOF (time-of-flight) sensor that measures the distance to a measurement target, is used to detect the condition of the floor surface.

Here, the detected condition of the floor surface includes, for example, a concave portion such as a hole formed in the floor surface, and a convex portion such as an obstacle placed on the floor surface.

The floor surface condition detection device may be provided inside a distance measuring device such as a TOF sensor, or may be provided outside the distance measuring device.

Electromagnetic waves emitted from lighting devices include, for example, light in a broad sense (ultraviolet light, visible light, infrared light), y (gamma) rays and X-rays which have a shorter wavelength than light, microwaves which have a longer wavelength than light, broadcast radio waves (short wave, medium wave, long wave), ultrasonic waves, elastic waves, quantum waves, and so forth.

The distance information acquisition unit may be configured to detect the reflection of electromagnetic waves and calculate distance information, or may be configured to acquire distance information from a distance sensor or the like provided as an external device, for example.

Consequently, even when the distance measuring device is installed in a transport device or the like capable of traveling over the floor surface, for example, the condition of the floor surface being traveled can be detected, so that irregularities such as holes or obstacles can be avoided, while still allowing for transport and other such work.

As a result, the condition of a floor surface can be accurately detected, and transport and other such work can be carried out efficiently.

The floor surface condition detection device according to the second invention is the floor surface condition detection device according to the first invention, wherein the condition detection unit detects irregularities on the floor surface by using the distance information.

Consequently, irregularities such as holes and obstacles formed in or on the floor surface can be accurately detected, so transport and other such work can be carried out efficiently.

The floor surface condition detection device according to the third invention is the floor surface condition detection device according to the first or second invention, further comprising an angle information acquisition unit that acquires angle information corresponding to each pixel included in a distance image.

Consequently, in a configuration in which the distance measuring device includes a light receiving lens (as a light receiving unit) and an image sensor that detects the amount of electromagnetic light received through the light receiving lens, for example, the angle with respect to a subject is determined by the light receiving lens for each pixel of the image sensor, so angle information corresponding to each pixel can be acquired.

The floor surface condition detection device according to the fourth invention is the floor surface condition detection device according to the third invention, further comprising a three-dimensional coordinate conversion unit that converts the distance information acquired by the distance information acquisition unit into three-dimensional coordinates on the basis of the angle information acquired by the angle information acquisition unit.

Consequently, distance information can be converted into three-dimensional coordinates (X, Y, Z) by using angle information corresponding to each pixel.

The floor surface condition detection device according to the fifth invention is the floor surface condition detection device according to the fourth invention, further comprising a plane detection unit that detects a floor surface on which the target has been placed.

Consequently, if the floor surface is detected in a preliminary step in which the distance to the target is actually measured, the distance (height) of the distance measuring device from the floor surface can be used as a reference value in detecting whether or not there is a target.

The floor surface condition detection device according to the sixth invention is the floor surface condition detection device according to the fifth invention, further comprising a height calculation unit that calculates the installation height of a distance measuring device on the basis of the three-dimensional coordinates converted by the three-dimensional coordinate conversion unit from the distance information for the floor surface detected by the plane detection unit.

Consequently, the installation height of the distance measuring device from the position of the floor surface is calculated, and the distance (height) of the distance measuring device from the floor surface can be used as a reference value in detecting the presence or absence of a target.

The floor surface condition detection device according to the seventh invention is the floor surface condition detection device according to the sixth invention, wherein the height calculation unit calculates, as the installation height, the coordinate value in the optical axis direction of the coordinate value re-acquired by rotating the orthogonal coordinate system of the distance measuring device around an axis by the angle formed by a vertical line of the floor surface detected by the plane detection unit and the optical axis of the distance measuring device.

Consequently, the coordinate value of the re-acquired coordinate value in the optical axis direction can be calculated as the installation height of the distance measuring device by rotating the orthogonal coordinate system of the distance measuring device around an axis by the angle formed by a vertical line of the floor surface and the optical axis of the distance measuring device, for the distance to the floor surface measured by the distance measuring device.

That is, for example, the installation height can be calculated so as to acquire the same distance information as when the distance measuring device emits light straight downward and the reflected light is received, by rotating by the angle formed by a vertical line of the floor surface and the optical axis of the distance measuring device so that the Z axis corresponding to the optical axis of the distance measuring device faces in the vertical direction.

The floor surface condition detection device according to the eighth invention is the floor surface condition detection device according to the seventh invention, wherein the height calculation unit calculates, as the installation height, the average value of the coordinate values in the vertical direction from among the plurality of coordinate values re-acquired by rotating the orthogonal coordinate system of the distance measuring device around an axis.

Consequently, the installation height of the distance measuring device from the floor surface can be accurately calculated even if the floor surface has minute irregularities, for example, by finding the average value for the coordinate value (distance) from the plane recognized as the floor surface, and calculating this average value as the installation height.

The floor surface condition detection device according to the ninth invention is the floor surface condition detection device according to the eighth invention, further comprising a coordinate rotation calculation unit that calculates the rotary coordinates obtained by rotating around an axis the three-dimensional coordinates converted from the distance information and the angle information in the three-dimensional coordinate conversion unit.

Consequently, in actual measurement of information about the distance to the target, the distance to the target can be detected by calculating the rotary coordinates obtained by rotating around an axis the three-dimensional coordinates converted from the distance information and the angle information.

That is, using the calculated rotary coordinates makes it possible to measure the distance in the height direction measured in a state of viewing from substantially directly above the target.

The floor surface condition detection device according to the tenth invention is the floor surface condition detection device according to the ninth invention, further comprising an irregularity detection unit that compares the coordinates in the height direction of the rotary coordinates calculated by the coordinate rotation calculation unit with the installation height calculated by the height calculation unit, and if an object having a positive or negative dimension in the height direction is detected, detects this object as an irregularity on or in the floor surface.

Consequently, the installation height to the floor surface can be compared with the height of the target (coordinates in the height direction), and whether or not the surface has irregularities can be easily detected according to whether or not the there is a change in dimension in the height direction with respect to the surface of the floor.

The floor surface condition detection device according to the eleventh invention is the floor surface condition detection device according to the tenth invention, further comprising a threshold value setting unit that sets a specific threshold value used in the detection of irregularities by the irregularity detection unit.

Consequently, in comparing the installation height to the floor surface with the height of the irregularities (coordinates in the height direction) during detection of the condition of the floor surface (irregularities, etc.), if the difference in height is above or below a specific threshold value, the object can be detected as an irregularity on or in the floor surface, which makes it less likely that erroneous detection will occur.

The floor surface condition detection device according to the twelfth invention is the floor surface condition detection device according to the tenth or eleventh invention, further comprising an output information selection unit that selects and outputs distance information for each pixel including the irregularities detected by the condition detection unit.

Consequently, the quantity of data to be outputted can be greatly reduced and the output load can be decreased by selectively outputting only the distance information corresponding to pixels that include the irregularities on or in the floor surface among all the pixels of the image sensor.

The distance measuring device according to the thirteenth invention comprises the floor surface condition detecting device according to any of the first to twelfth inventions; a lighting device that irradiates a target with electromagnetic waves; and a light receiving unit that detects the amount of reflected electromagnetic waves emitted from the lighting device.

Consequently, the floor surface condition detection device described above can be provided inside a distance measuring device comprising a lighting device and a light receiving unit, the result being a distance measuring device with which the floor surface condition can be accurately detected.

The distance measuring device according to the fourteenth invention is the distance measuring device according to the thirteenth invention, further comprising a memory unit that stores at least one of the following: distance information, angle information corresponding to each pixel included in the distance image, the orthogonal coordinate system of the distance measuring device, the installation height, rotary coordinates obtained by rotating around an axis the three-dimensional coordinates converted from the distance information and the angle information, a threshold used when detecting the target, and coordinate values of pixels to be outputted.

Consequently, distance information, angle information, an orthogonal coordinate system, installation height, rotary coordinates, thresholds, coordinate values of the pixels to be outputted, and so forth are stored in the distance measuring device, which means that various kinds of saved data can be used to carry out processing for detecting the floor surface condition.

The distance measuring device according to the fifteenth invention is the distance measuring device according to the thirteenth or fourteenth invention, further comprising an output unit that outputs to an external device the distance information corresponding to the pixels selected by the output information selection unit.

Consequently, for example, the quantity of data in the information including the distance information outputted from the distance measuring device can be greatly reduced by outputting only the distance information corresponding to the pixels determined to include the target and selected, from the output unit to the external device.

The floor surface condition detection method according to the sixteenth invention is a floor surface condition detection method for detecting the condition of a floor surface on which an object has been placed, the method comprising a distance information acquisition step and a condition detection step. The distance information acquisition step involves acquiring information about the distance to the target according to the amount of reflection of electromagnetic waves emitted from a lighting device toward the target. The condition detection step involves detecting the condition of the floor surface on which the target has been placed on the basis of the distance information acquired in the distance information acquisition step.

Here, for example, reflected light of light emitted from an LED (light emitting diode; used as a light source) toward a target is received, and information about the distance to the target, acquired from a TOF (time-of-flight) sensor that measures the distance to the measurement target, is used to detect the condition of the floor surface.

Here, the detected condition of the floor surface includes, for example, a concave portion such as a hole formed in the floor surface, and a convex portion such as an obstacle placed on the floor surface.

The floor surface condition detection method may be performed inside a distance measuring device such as a TOF sensor, or may be performed outside the distance measuring device.

Electromagnetic waves emitted from lighting devices include, for example, light in a broad sense (ultraviolet light, visible light, infrared light), y (gamma) rays and X-rays which have a shorter wavelength than light, microwaves which have a longer wavelength than light, broadcast radio waves (short wave, medium wave, long wave), ultrasonic waves, elastic waves, quantum waves, and so forth.

In the distance information acquisition step, the distance information may be calculated by detecting the reflection of electromagnetic waves, or the distance information may be acquired from a distance sensor provided as an external device, for example.

Consequently, even when the distance measuring device is installed in a transport device or the like capable of traveling over the floor surface, for example, the condition of the floor surface being traveled can be detected, so that irregularities such as holes or obstacles can be avoided, while still allowing for transport and other such work.

As a result, the condition of a floor surface can be accurately detected, and transport and other such work can be carried out efficiently.

The floor surface condition detection program according to the seventeenth invention is a floor surface condition detection program for detecting the condition of a floor surface on which a target has been placed, wherein the program causes a computer to execute a floor surface condition detection method comprising a distance information acquisition step and a condition detection step. The distance information acquisition step involves acquiring information about the distance to the target according to the amount of reflection of electromagnetic waves emitted from a lighting device toward the target. The condition detection step involves detecting the condition of the floor surface on which the target has been placed on the basis of the distance information acquired in the distance information acquisition step.

Here, for example, reflected light of the light emitted from an LED (light emitting diode; used as a light source) toward a target is received, and information about the distance to the target, which is acquired from a TOF (time-of-flight) sensor that measures the distance to a measurement target, is used to detect the condition of the floor surface.

Here, the detected condition of the floor surface includes, for example, a concave portion such as a hole formed in the floor surface, and a convex portion such as an obstacle placed on the floor surface.

The floor surface condition detection method may be performed inside a distance measuring device such as a TOF sensor, or may be performed outside the distance measuring device.

Electromagnetic waves emitted from lighting devices include, for example, light in a broad sense (ultraviolet light, visible light, infrared light), y (gamma) rays and X-rays which have a shorter wavelength than light, microwaves which have a longer wavelength than light, broadcast radio waves (short wave, medium wave, long wave), ultrasonic waves, elastic waves, quantum waves, and so forth.

In the distance information acquisition step, the distance information may be calculated by detecting the reflection of electromagnetic waves, or the distance information may be acquired from a distance sensor provided as an external device, for example.

Consequently, even when the distance measuring device is installed in a transport device or the like capable of traveling over the floor surface, for example, the condition of the floor surface being traveled can be detected, so that irregularities such as holes or obstacles can be avoided, while still allowing for transport and other such work.

As a result, the condition of a floor surface can be accurately detected, and transport and other such work can be carried out efficiently.

(Effects)

The floor surface condition detection device according to the present invention allows the condition of a floor surface to be accurately detected.

BRIEF DESCRIPTION OF DRAWINGS

FIG. 12 is a flowchart showing the flow of calibration processing performed before the actual measurement, among the processing of the floor surface condition detection method performed by the distance measuring device of FIG. 1;

FIG. 13 is a flowchart showing the flow of processing during actual distance measurement, among the processing of the floor surface condition detection method performed by the distance measuring device of FIG. 1;

FIG. 16 is a flowchart of the detection of slope in FIG. 11 in the processing of step S25 in FIG. 13.

DETAILED DESCRIPTION OF THE INVENTION

Embodiment 1

A distance measuring device 20 comprising a control unit (floor surface condition detection device) 10 according to an embodiment of the present invention will now be described with reference to FIGS. 1 to 16.

(1) Configuration of Distance Measuring Device 20

Figure 1:
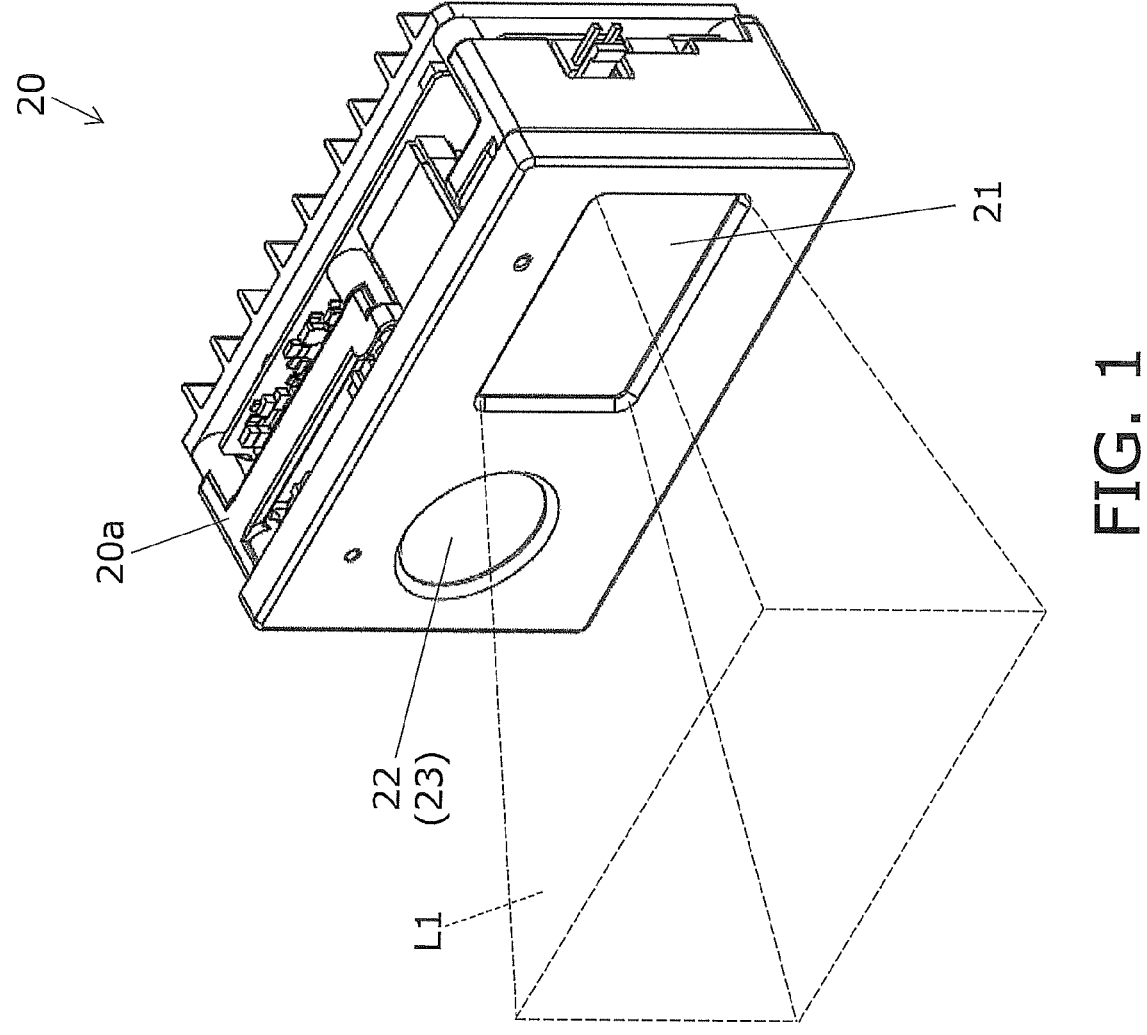
FIG. 1 is an oblique view of the external configuration of the distance measuring apparatus according to an embodiment of the present invention.

As shown in FIG. 1, with the distance measuring device 20 according to this embodiment, the reflected light of the light L1 (an example of electromagnetic waves) emitted from a lighting device 21 provided on the surface of a main body 20a toward a target 30 is received by an image sensor 23 via a light receiving lens 22 to acquire distance information calculated according to the time of flight of the light, from the emission of the light L1 until its reception.

Figure 2:
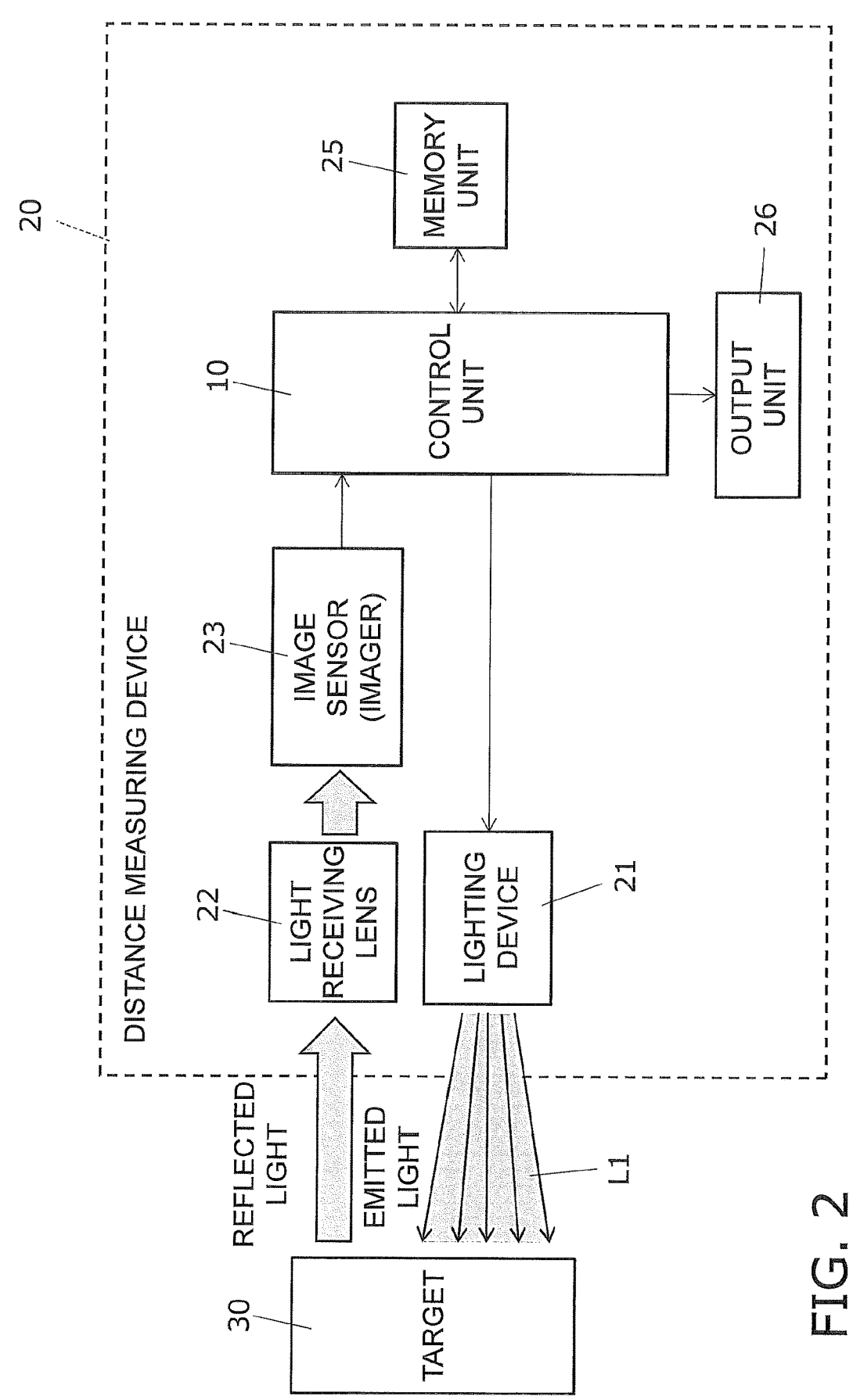
FIG. 2 is a control block diagram of the distance measuring device in FIG. 1.

As shown in FIG. 2, the distance measuring device 20 comprises the lighting device 21, the light receiving lens 22, the image sensor 23, a control unit (floor surface condition detection device) 10, a memory unit 25, and an output unit 26.

The lighting device 21 has an LED, for example, and irradiates the target 30 with light of the desired wavelength. The lighting device 21 is provided with a projection lens (not shown) that collects the light emitted from the LED and guides it in the direction of the target 30.

The light receiving lens 22 is provided to receive the light that is emitted from the lighting device 21 toward the target 30 and reflected by the target 30, and guide this reflected light to the image sensor 23.

The image sensor 23 has a plurality of pixels, each of these pixels receiving the reflected light received by the light receiving lens 22, and transmits a photoelectrically converted electrical signal to the control unit 10. Also, an electrical signal corresponding to the received amount of reflected light sensed by the image sensor 23 is used by the control unit 10 to calculate distance information for each pixel.

As shown in FIG. 2, the control unit 10 is connected to the lighting device 21, the image sensor 23, and the memory unit 25. The control unit 10 reads a lighting control program stored in the memory unit 25 and controls the lighting device 21 that irradiates the target 30 with light. More precisely, the control unit 10 controls the lighting device 21 so as to emit the optimum light according to the properties of the target, such as the distance to the target 30 to be irradiated with the light, the shape, and the color. The control unit 10 also calculates information about the distance to the target 30 for each pixel on the basis of the electrical signal corresponding to each pixel received from the image sensor 23.

The principle of measuring the distance to the target 30 with the distance measuring device 20 will be described in detail below.

As shown in FIG. 2, the memory unit 25 is connected to the control unit 10, and stores a control program for controlling the lighting device 21 and the image sensor 23, the amount of reflected light sensed by the image sensor 23, the light reception timing, distance information calculated based on the amount of reflected light, and other such data. Furthermore, the memory unit 25 stores distance information, angle information, orthogonal coordinate system, installation heights, rotary coordinates, threshold values, coordinate values of pixels to be outputted, and other such information, which will be described below.

The output unit 26 outputs distance information corresponding to the pixels selected by the output information selection unit 19 (see FIG. 3) (discussed below), to an external device.

The distance information corresponding to each pixel outputted from the output unit 26 is limited to information corresponding to some of the selected pixels, not all of the pixels. Therefore, the output load can be reduced, and the post-processing load on the external device, which is the output destination, can also be reduced.

(2) Configuration of Control Unit 10

Figure 3:
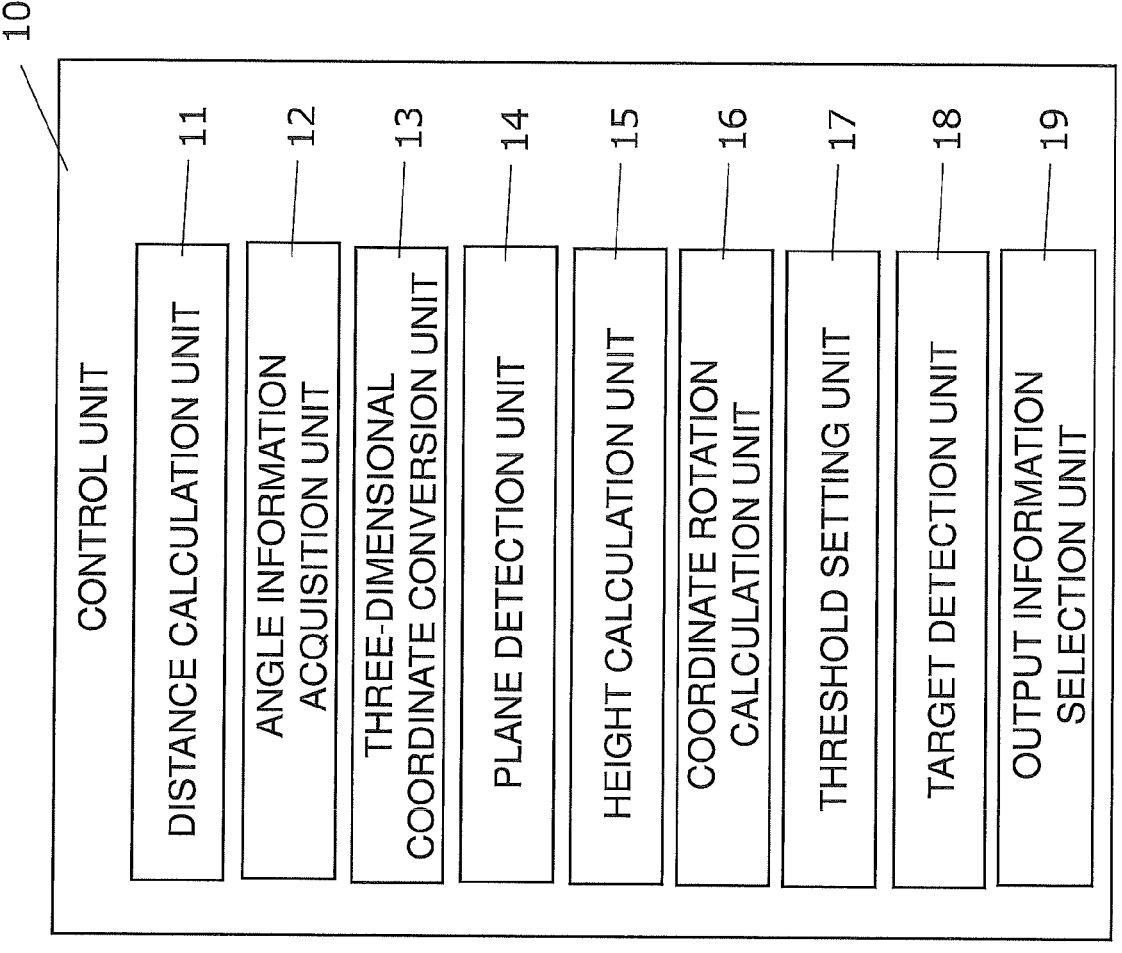
FIG. 3 is a control block diagram formed in the control unit of the distance measuring device in FIG. 2.

As shown in FIG. 3, the control unit 10 comprises a distance calculation unit (distance information acquisition unit) 11, an angle information acquisition unit 12, a three-dimensional coordinate conversion unit 13, a plane detection unit 14, a height calculation unit 15, a coordinate rotation calculation unit 16, a threshold value setting unit 17, an target detection unit (condition detection unit) 18, and an output information selection unit 19.

The distance calculation unit 11 calculates information about the distance to the target 30 corresponding to each pixel of a grayscale image captured by the image sensor 23 on the basis of the TOF (time of flight) distance measurement principle (discussed below).

The angle information acquisition unit 12 acquires angle information corresponding to each pixel since the angle of incidence of the reflected light on a subject is determined for each of the plurality of pixels constituting the distance image generated by the image sensor 23 that receives the reflected light via the light receiving lens 22.

Figure 7:
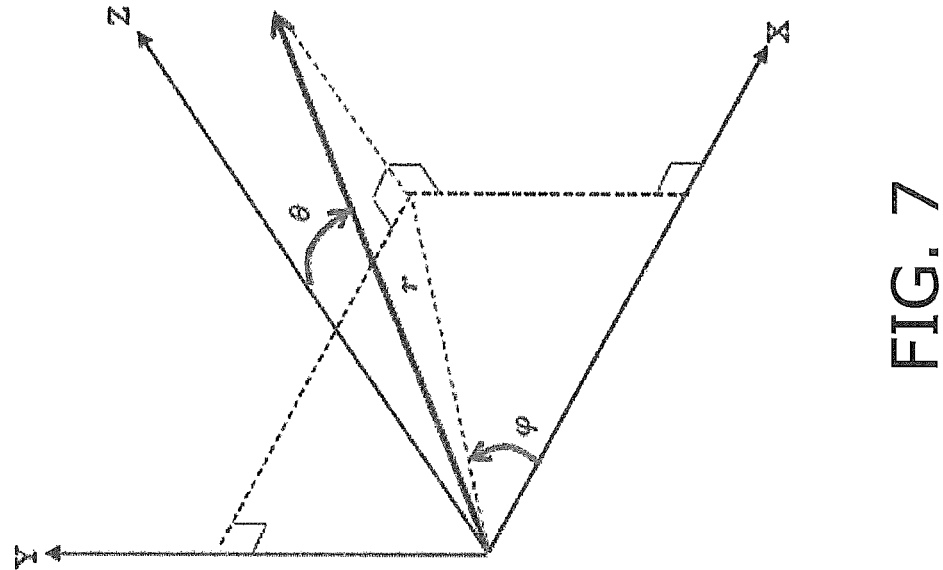
FIG. 7 is a diagram illustrating the conversion to the orthogonal coordinate format of FIG. 6.

The three-dimensional coordinate conversion unit 13 converts the distance information acquired by the distance calculation unit 11 into three-dimensional coordinates (X, Y, Z) in an orthogonal coordinate format on the basis of the angle information acquired by the angle information acquisition unit 12 (see FIG. 7).

The plane detection unit 14 detects a floor surface FL by designating the range of pixels that will detect the floor surface FL on which the target 30 has been placed, as a reference in measuring the distance to the target 30 (calibration processing).

The height calculation unit 15 calculates the installation height h of the distance measuring device 20 from the floor surface FL on the basis of the three-dimensional coordinates (X, Y, Z) converted by the three-dimensional coordinate conversion unit 13 from the distance information (height) at the floor surface FL detected by the plane detection unit 14. More precisely, the height calculation unit 15 calculates a coordinate value Zr in the optical axis direction as the installation height h (see FIG. 6), from among the coordinate values (X, Yr, Zr) re-acquired by rotating around an axis the orthogonal coordinate system (X, Y, Z) of the distance measuring device 20 by the angle θ formed by a vertical line of the floor surface FL and the optical axis of the distance measuring device 20.

In this embodiment, the height calculation unit 15 calculates, as the installation height h, the average value of the coordinate values in the Z direction of a plurality of coordinate values (Xr, Yr, Zr) re-acquired by rotating around an axis the orthogonal coordinate system (X, Y, Z) of the distance measuring device 20.

10

Figure 6:
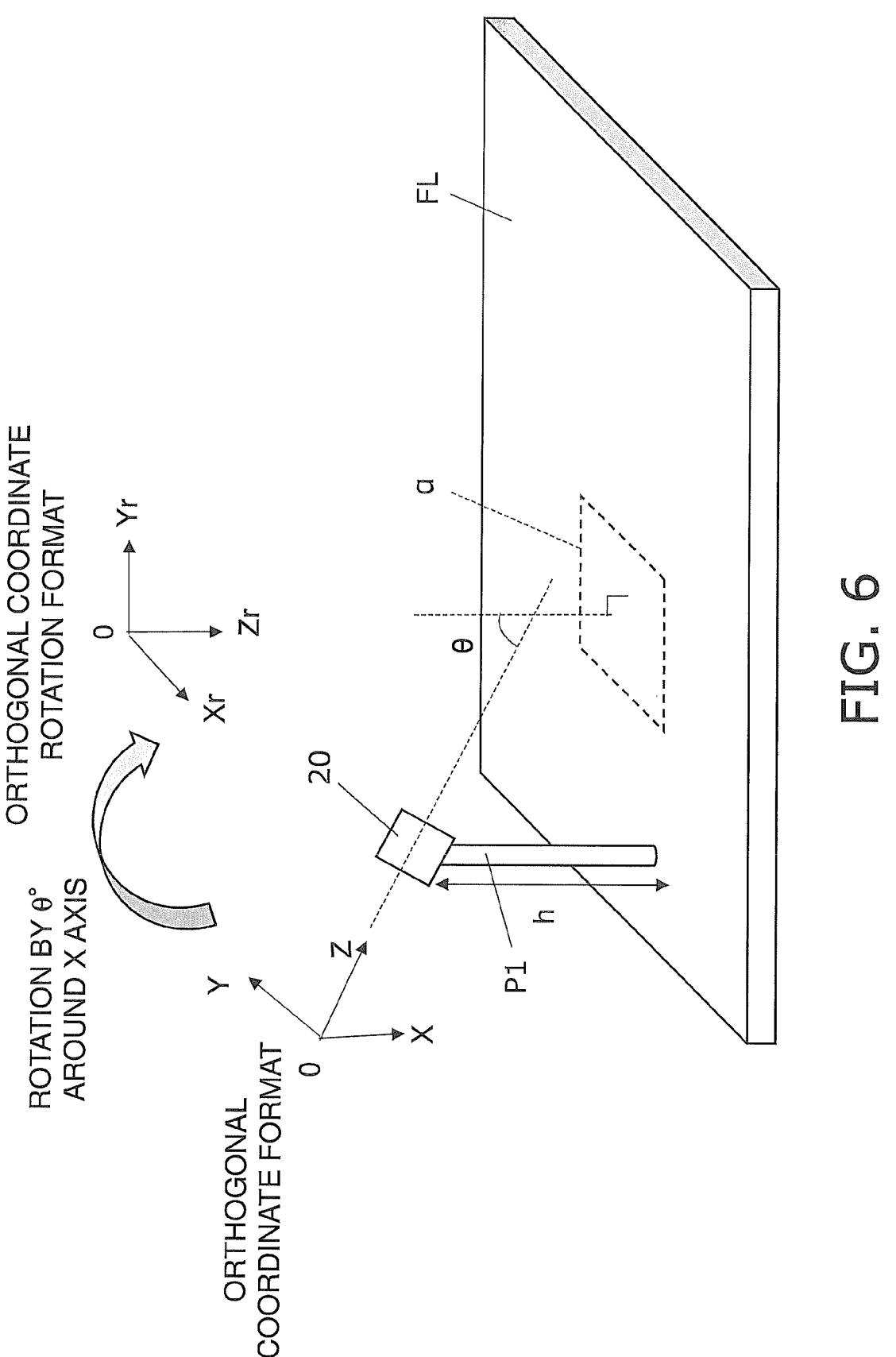
FIG. 6 is a diagram of a orthogonal coordinate rotation format in which the orthogonal coordinate format (three-dimensional coordinates) of the distance measuring device of FIG. 5 has been rotated by an angle θ around the X axis.

The coordinate rotation calculation unit 16 calculates rotary coordinates (orthogonal coordinate rotation format) obtained by rotating around an axis the three-dimensional coordinates (orthogonal coordinate format) converted from the distance information and angle information in the three-dimensional coordinate conversion unit 13 (see FIG. 6).

The threshold value setting unit 17 sets a specific threshold value that is used in detection of the target 30 by the target detection unit 18. The threshold value set by the threshold value setting unit 17 may be appropriately set to different values according to the form, shape, size, and so forth of the target 30 being detected.

The target detection unit 18 compares the coordinate z in the height direction of the rotary coordinates calculated by the coordinate rotation calculation unit 16 with the installation height h calculated by the height calculation unit 15, and if an object having a dimension in the height direction is detected, this object is detected as an target 30 placed on the floor surface FL.

The output information selection unit 19 selects and outputs, as the output target, only distance information corresponding to the pixels including the target 30, among the plurality of pixels constituting the distance image including the target 30 detected on the basis of the distance information calculated by the distance calculation unit 11.

Distance Measurement Principle Used by Distance Measuring Device 20

Figure 4:
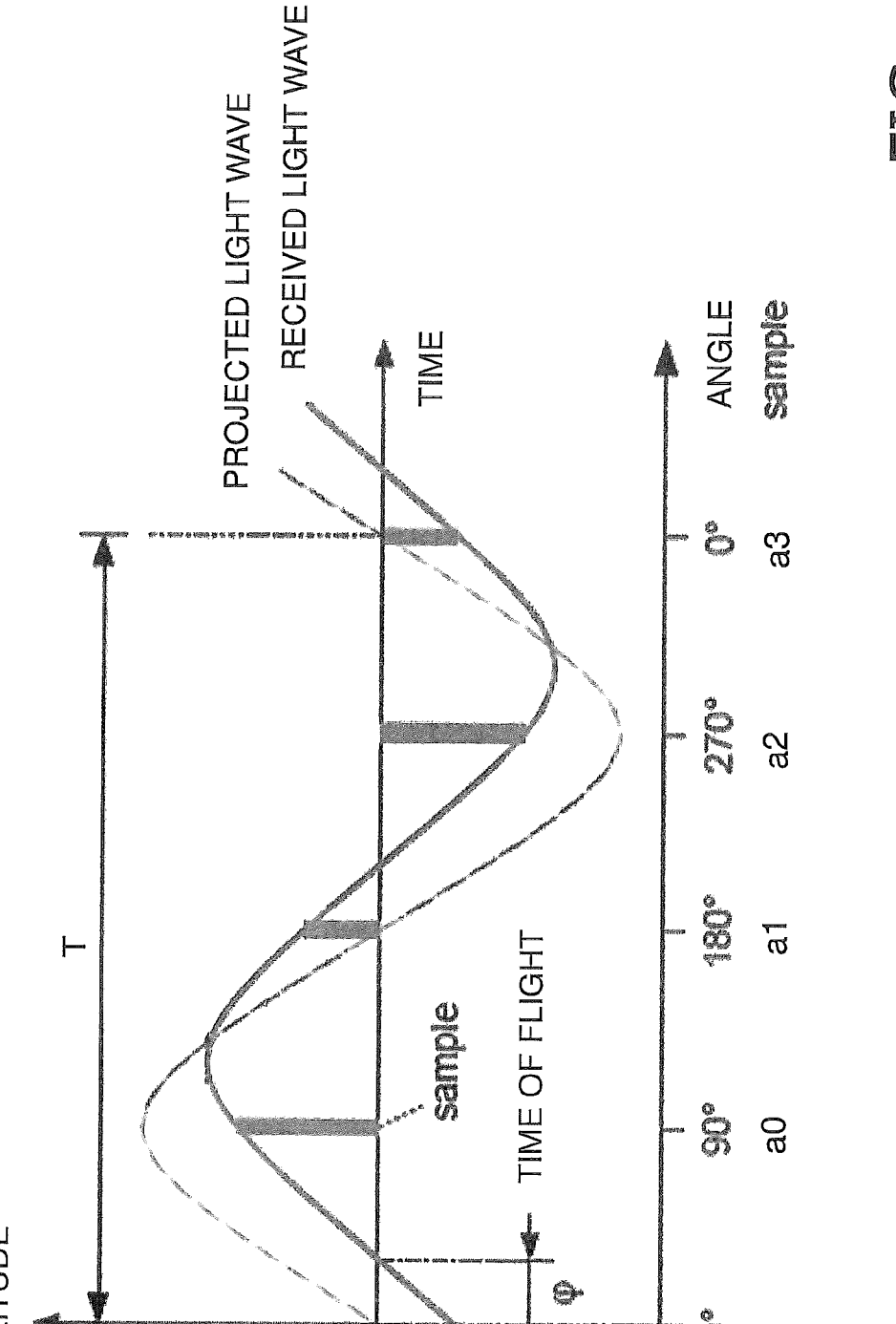
FIG. 4 is a diagram illustrating the principle of calculating the distance to a target, which is calculated by TOF method, included in the distance measuring device of FIG. 2.

The principle by which the distance measuring device 20 in this embodiment measures the distance to an object will now be described with reference to FIG. 4.

That is, in this embodiment, the control unit 10 (distance calculation unit 11) of the distance measuring device 20 calculates the distance to the target 30 on the basis of the phase difference Φ (see FIG. 4) between the projected wave of light emitted from the lighting device 21 and the received wave of light received by the image sensor 23.

Here, the phase difference Φ is represented by the following relational expression (1).

$$\Phi=\text{atan}(y/x) \tag{1}$$

(where x=a2−a0, y=a3−a1, and a0 to a3 are amplitudes at points where the received wave was sampled four times at 90-degree intervals)

The conversion formula from the phase difference D to the distance D is shown by the following relational formula (2).

$$D=(c/(2 \times f_{LED})) \times (\Phi/2\pi)+D_{OFFSET} \tag{2}$$

(where c is the speed of light ($\approx 3 \times 10^8$ m/s), $f_{LED}$ is the frequency of the LED projected light wave, and $D_{OFFSET}$ is the distance offset)

Consequently, if the reflected light of the light emitted from the lighting device 21 is received and the phase differences thereof are compared, the distance calculation unit 11 can use the speed of light c to easily calculate the distance to the target 30.

Processing to Select Output Target

How the control unit 10 of the distance measuring device 20 in this embodiment selects the output target will now be described with reference to the drawings.

Figure 5:
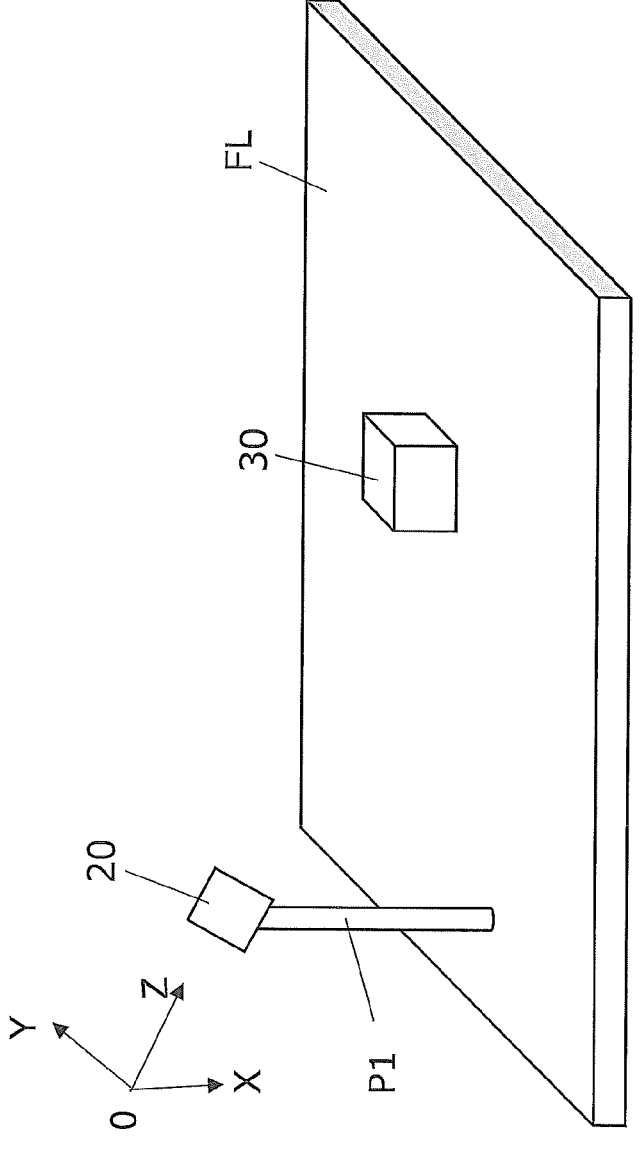
FIG. 5 is a diagram of the positional relation between the distance measuring device of FIG. 1 and a target placed on a floor surface.

In this embodiment, as shown in FIG. 5, we shall assume that the distance measuring device 20 is attached to the upper end of a post P1, which has a height h and is installed on the floor surface FL, at a mounting angle facing obliquely downward, and that a target 30 has been placed on the floor surface FL.

In this case, the distance measuring device 20 calculates the distance to an object (target 30, floor surface FL, etc.) shown in all the pixels of the image sensor 23, and stores three-dimensional coordinates (X, Y, Z) (with the distance measuring device 20 as the origin) as distance information corresponding to each pixel.

The distance measuring device 20 of this embodiment performs the following output control processing in order to selectively output just the distance information for the pixels corresponding to the position where the target 30 is located, from among the distance information corresponding to each of these pixels.

First, as a preliminary preparation, the distance measuring device 20 performs calibration for calculating the installation height h from the floor surface FL.

More specifically, as shown in FIG. 5, the distance measuring device 20 measures the distance above the floor surface FL in the orthogonal coordinate system (X, Y, Z), and acquires the measurement result (X, Y, Z) coordinate values at each pixel.

Next, the distance measuring device 20 performs plane detection on the acquired result within the designated pixel range, and finds coefficients a, b, c, and d of the equation aX+bY+cZ+d=0 of the plane α.

The plane detection and the derivation of a, b, c, and d can be performed by utilizing an existing technique. For instance, these can be found by using the sample code of plane detection (plane model segmentation) presented in Point Cloud Library (see http://pointclouds.org/documentation/tutorials/planar_segmentation.html etc.).

Next, the distance measuring device 20 finds the angle $\theta$ formed by a vertical line of the floor surface FL and the Z axis of the orthogonal coordinate system of the distance measuring device 20.

Here, the angle $\theta$ formed by the plane α shown in FIG. 6 and the Z axis (z+t=0) of the orthogonal coordinate system of the distance measuring device 20 is found from the following relational expression (1).

$$\theta = \cos^{-1}(|a \times 0 + b \times 0 + c \times 1| \div ((a^2 + b^2 + c^2)^{1/2} \times (0^2 + 0^2 + 1^2))) \quad (1)$$

When the distance is measured again with the orthogonal coordinate rotation system obtained by rotating the orthogonal coordinate system by $\theta$ degrees around the X axis, the coordinate values of the measurement results (Xr, Yr, Zr) of the orthogonal coordinate rotation system at each pixel are obtained.

Next, the distance measuring device 20 calculates the average value of Zr in the plane range in which the plane α was detected, and calculates this average value as the height h from the floor surface FL.

The processing to convert the measured value of the distance at each pixel of the image sensor 23 into three-dimensional coordinates on the basis of angle information will now be described with reference to FIG. 7.

As shown in FIG. 7, the distance measuring device 20 converts the measured value r of distance corresponding to each pixel into the three-dimensional coordinates X, Y, and Z using the angles $\theta$ and $\varphi$.

Here, r, $\theta$, and $\varphi$ and X, Y, and Z shown in FIG. 7 are defined as follows.

$$X = r \times \sin\theta \cos\varphi$$

$$Y = r \times \sin\theta \sin\varphi$$

$$Z = r \times \cos\theta$$

(The measured value r is the magnitude of the distance vector r, the angle $\theta$ is the angle formed by the direction of the distance vector r and the Z axis, and the angle information $\varphi$ is the angle formed by the projection vector of the distance vector r to the X-Y plane and the X axis.)

Next, the processing to rotate the three-dimensional coordinates (X, Y, Z) obtained by converting the measured values of distance corresponding to each pixel around the X axis, Y axis, and Z axis, respectively, and convert these into an orthogonal coordinate rotation system will be described with reference to FIG. 8.

Here, the distance measuring device 20 specifies rotation angles around the X axis, Y axis, and Z axis, and uses the following relational expression (2) to calculate the coordinate values Xr, Yr, and Zr after rotation, with respect to the X, Y, and Z coordinates of all pixels.

[First Mathematical Formula]

$$\begin{bmatrix} Xr \\ Yr \\ Zr \end{bmatrix} = \begin{bmatrix} 1 & 0 & 0 \\ 0 & \cos\theta x & \sin\theta x \\ 0 & -\sin\theta x & \cos\theta x \end{bmatrix} \times \quad (2)$$

$$\begin{bmatrix} \cos\theta y & 0 & -\sin\theta y \\ 0 & 1 & 0 \\ \sin\theta y & 0 & \cos\theta y \end{bmatrix} \times \begin{bmatrix} \cos\theta z & \sin\theta z & 0 \\ -\sin\theta z & \cos\theta z & 0 \\ 0 & 0 & 1 \end{bmatrix} \times \begin{bmatrix} Xo \\ Y_O \\ Zo \end{bmatrix}$$

Figure 8:
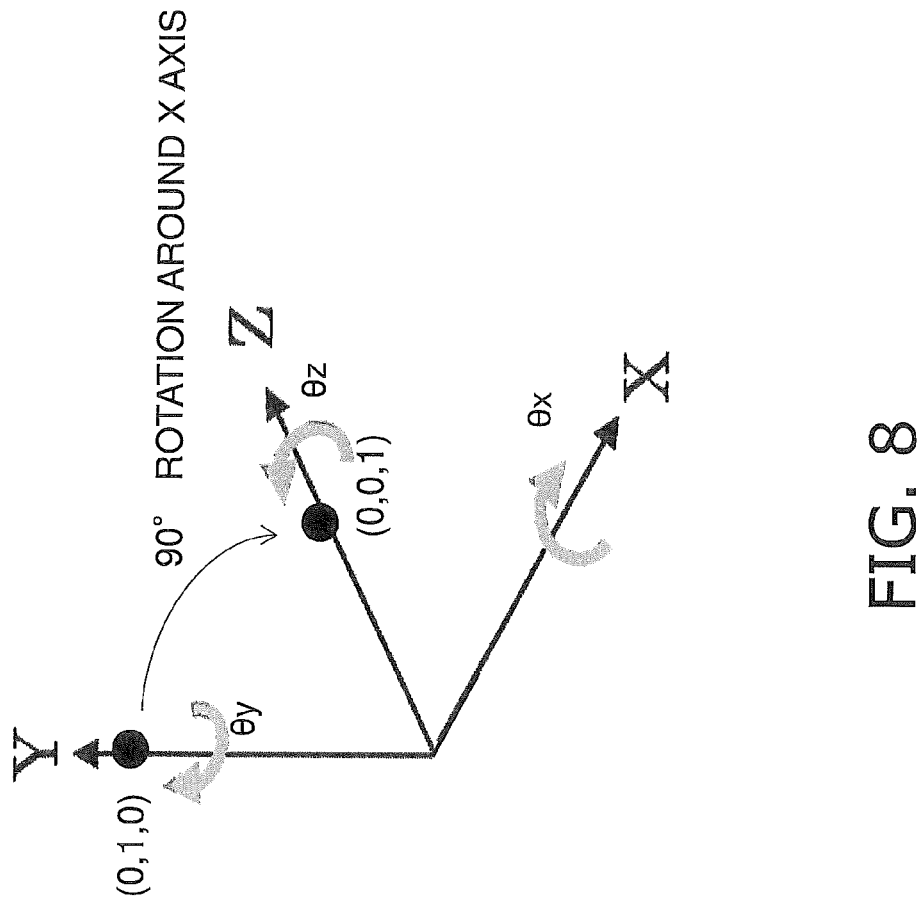
FIG. 8 is a diagram illustrating the conversion to the orthogonal coordinate rotation format of FIG. 6.

For example, as shown in FIG. 8, when the three-dimensional coordinate values of a certain pixel are (X, Y, Z)=(0, 1, 0), and when there are 90 degrees of rotation around the X axis but no rotation around the Y axis or the Z axis, the coordinates after rotation will be (Xr, Yr, Zr)=(0,0,1).

Figure 9:
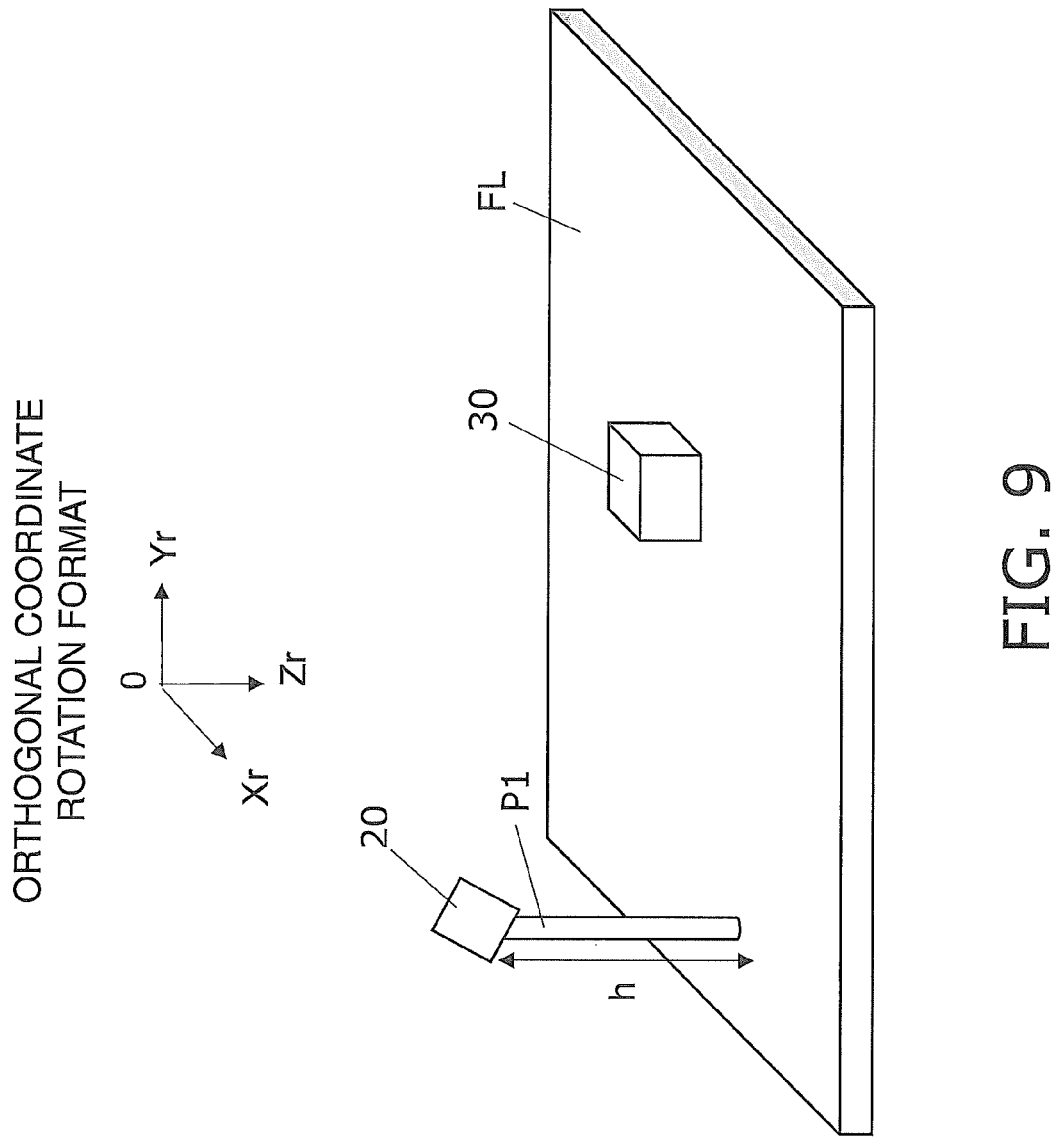
FIG. 9 is a diagram showing the positional relation between the distance measuring device of FIG. 1 and a target placed on a floor surface in an orthogonal coordinate rotation format.

After the installation height h of the distance measuring device 20 has been found by the calibration processing described above, the distance to the target 30 is then actually measured as shown in FIG. 9.

That is, the distance is measured in the orthogonal coordinate rotation format rotated by $\theta$ degrees around the X axis, and the measurement results (Xr, Yr, Zr) for distance at each pixel of the image sensor 23 are acquired.

At this point, in the distance measuring device 20, a specific threshold value S1 for detecting the target 30 is set by the threshold value setting unit 17.

Then, the distance measuring device 20 compares the value of Zr in the coordinates (Xr, Yr, Zr) acquired as the measurement result with the value of the installation height h calculated in the calibration processing, and if the difference between the two exceeds the specific threshold value S1, it is determined that the target 30 is included in that pixel, and the measurement result coordinates (Xr, Yr, Zr) corresponding to that pixel are selected as the output target.

In the distance measuring device 20 of this embodiment, as shown in FIG. 9, for example, the target 30 placed on the floor surface FL is detected, and information about the distance to that target 30 is selected and outputted.

At this point, the threshold value S1 is set as the threshold for detecting the target 30 placed on the floor surface FL.

Then, focusing on Zr of the distance measurement results (Xr, Yr, Zr) obtained in the orthogonal coordinate rotation format, the difference (h−Zr) is calculated for each of the pixels of the image sensor 23.

If the difference (h−Zr)>S1, it is determined that the target 30 is at that pixel position, and the distance information corresponding to that pixel is selected and outputted.

With the distance measuring device 20 of this embodiment, as described above, distance information and angle information about the target 30 acquired by TOF method is used to convert the measured distance information into the orthogonal coordinate rotation format. Then, the distance measuring device 20 compares the installation height h with the Zr value, which allows positions there the object is located (where the difference between the floor surface FL and the height is at or above the specific threshold value S1) to be distinguished from positions on the floor surface where there is no object, so that a position where the object is located can be detected as a pixel where the target 30 is present.

Consequently, if only distance information corresponding to pixels where the target 30 is detected is selected and outputted, this avoids the output of unnecessary information such as information about the distance to positions of the floor surface without any target 30, so the quantity of data that is outputted can be greatly reduced.

Next, the processing when the target detected using distance information as described above is a hole 130a formed in the floor surface FL will be described with reference to FIG. 10.

Figure 10:
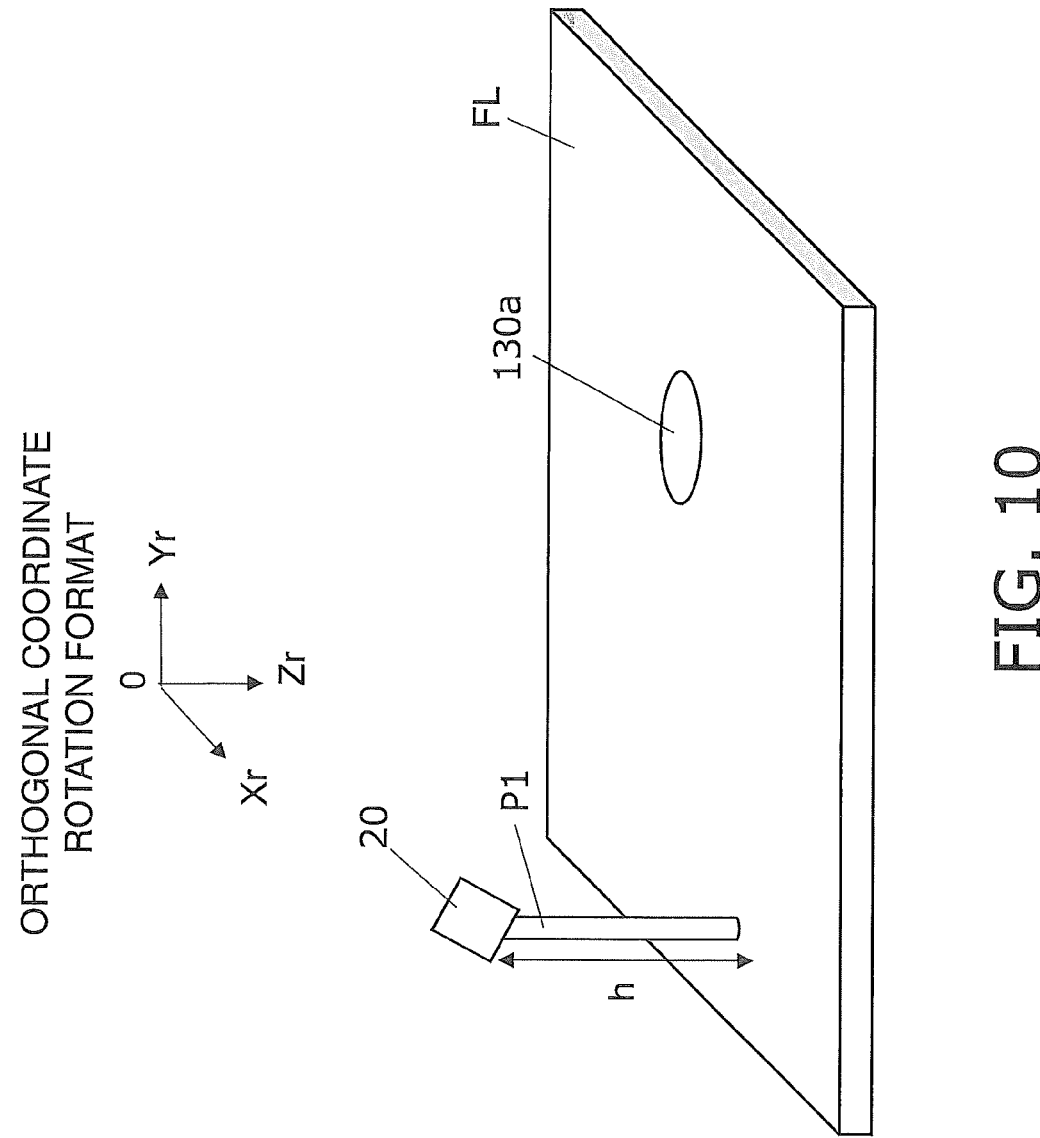
FIG. 10 is a diagram showing the positional relation between the distance measuring device of FIG. 1 and a hole made in the floor surface, in an orthogonal coordinate rotation format.

Here, as shown in FIG. 10, the hole 130a formed in the floor surface FL is detected, and only the distance measurement result for this hole is selected and outputted.

More specifically, after the installation height h of the distance measuring device 20 is found by the calibration processing described above, the distance to the target (hole 130a) is actually measured as shown in FIG. 10.

That is, the distance is measured in the orthogonal coordinate rotation format rotated by θ degrees around the X axis, and the measurement results (Xr, Yr, Zr) for distance at each pixel of the image sensor 23 are acquired.

At this point, in the distance measuring device 20, a specific threshold value S2 for detecting the hole 130a is set by the threshold value setting unit 17.

Then, the distance measuring device 20 compares the value of Zr in the coordinates (Xr, Yr, Zr) of all the pixels acquired as the measurement result with the value of the installation height h calculated in the calibration processing, and if the difference (h−Zr) is below the specific threshold value S2, it is determined that the hole 130a is included in that pixel, and the measurement result coordinates (Xr, Yr, Zr) corresponding to that pixel are selected as the output target.

This makes it easy to detect the position at which the hole 130a is located as the state of the floor surface FL, and if only distance information corresponding to pixels where the hole 130a is detected is selected and outputted, this avoids the output of unnecessary information such as information about the distance to positions of the floor surface without the hole 130a, so the quantity of data that is outputted can be greatly reduced.

Next, the processing when the target detected using distance information as discussed above is a slope 130b that is formed on the floor surface FL and whose height changes will be described with reference to FIG. 11.

Figure 11:
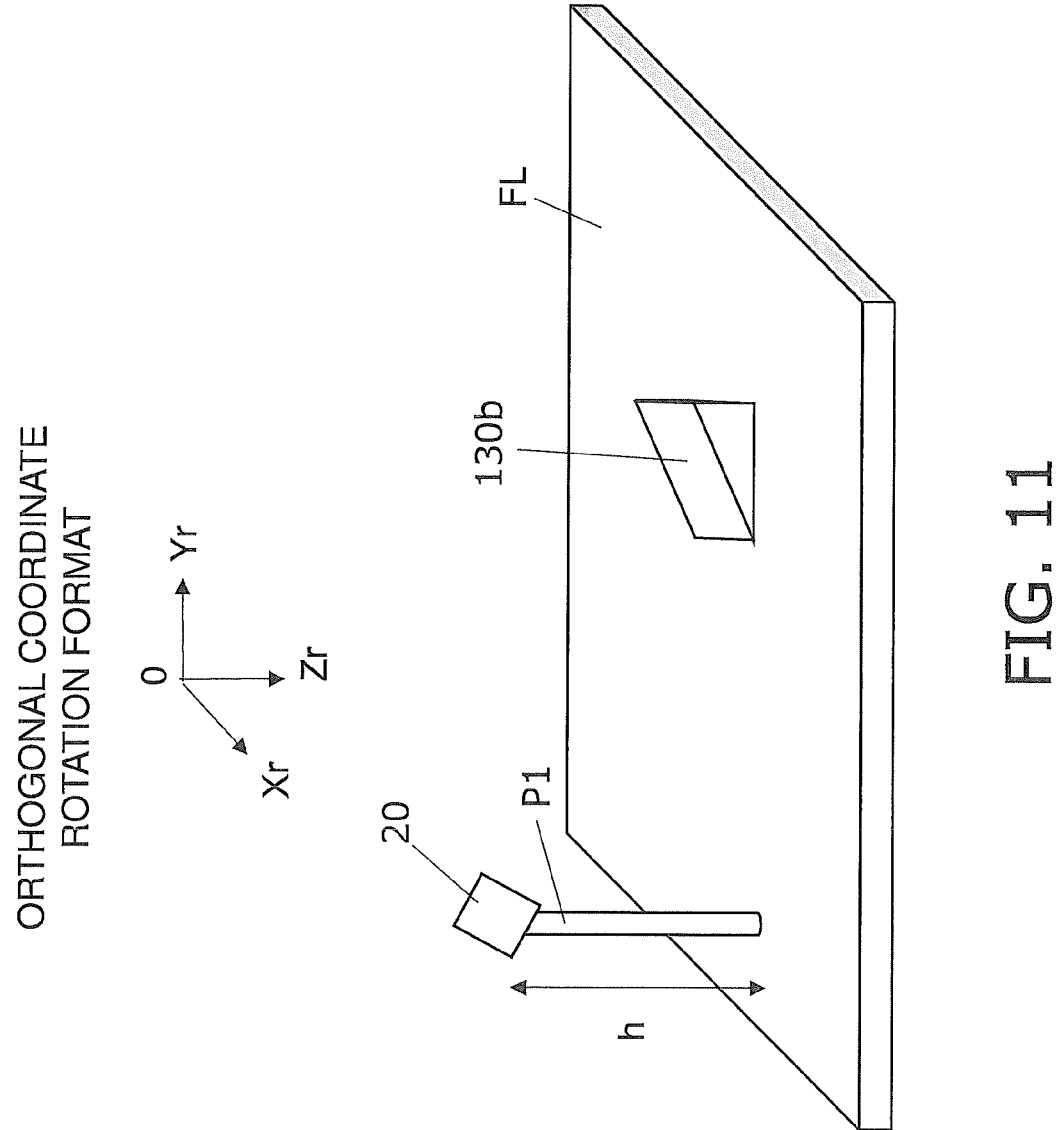
FIG. 11 is a diagram showing the positional relation between the distance measuring device of FIG. 1 and a slope on the floor surface, in an orthogonal coordinate rotation format.

Here, as shown in FIG. 11, the slope 130b whose height changes on the floor surface FL is detected, and only that distance measurement result is selected and outputted.

More specifically, after the installation height h of the distance measuring device 20 is found by the calibration processing described above, the distance to the object (slope 130b) is actually measured as shown in FIG. 11.

That is, the distance is measured in the orthogonal coordinate rotation format rotated by θ degrees around the X axis, and the measurement results (Xr, Yr, Zr) for distance at each pixel of the image sensor 23 are acquired.

At this point, with the distance measuring device 20, a specific threshold value S3 for detecting the slope 130b is set by the threshold value setting unit 17.

Then, the distance measuring device 20 finds the amount of change between adjacent upper, lower, left, and right pixels $(\Delta Zr/\Delta Xr)+(\Delta Zr/\Delta Yr)$, focusing on the value of Zr among the coordinates (Xr, Yr, Zr) of all the pixels acquired as the measurement results.

If $(\Delta Zr/\Delta Xr)+(\Delta Zr/\Delta Yr)$ is above the specific threshold value S3, it is determined that the slope 130b is included in that pixel, and the measurement result corresponding to that pixel are selected and outputted.

Consequently, if just the distance information corresponding to the pixels where the slope 130b is detected is selected and outputted as the state of the floor surface FL, this avoids the output of unnecessary information such as information about the distance to positions of the floor surface FL where the slope 130b is not present, and the amount of output data can be greatly reduced.

Flow of Processing in Floor Surface Condition Detection Method

The distance measuring device 20 of this embodiment carries out the floor surface condition detection method according to the flowcharts shown in FIGS. 12 to 16 with the above components.

That is, in FIG. 12, as discussed above, calibration processing is performed as a step before the distance to the target 30 is actually measured.

In step S11, the distance calculation unit 11 of the distance measuring device 20 calculates distance information from information about the phase difference at all the pixels of the image sensor 23.

Next, in step S12, the three-dimensional coordinate conversion unit 13 converts distance information into three-dimensional coordinates (X, Y, Z) in orthogonal coordinate format, on the basis of the distance information for each pixel calculated in step S11 and the angle information corresponding to each pixel acquired by the angle information acquisition unit 12.

Next, in step S13, the plane detection unit 14 performs plane detection processing over a specific plane range on the floor surface FL on which the distance measuring device 20 is installed.

Next, in step S14, the height calculation unit 15 calculates the angle θ (see FIG. 6) formed by the Z axis of the three-dimensional coordinates of the distance measuring device 20 and a vertical line of the floor surface FL.

Next, in step S15, the coordinate rotation calculation unit 16 calculates the coordinates (Xr, Yr, Zr) in orthogonal coordinate rotation format obtained by rotating the three-dimensional coordinates around three axes by the designated angle θ at all the pixels.

Next, in step S16, the height calculation unit 15 finds the average value of Zr in a specific plane range of the floor surface FL, and sets this as the installation height h.

With the distance measuring device 20 of this embodiment, the result of the above processing is that calibration processing is performed as a preliminary stage for measuring the distance to the actual target 30, and the installation height h of the distance measuring device 20 is set, which serves as a reference used to detect the position of the target 30.

Then, as shown in FIG. 13, after the calibration processing shown in FIG. 12 is performed, a step of measuring the distance to the actual target 30 is carried out.

That is, in step S21, the distance calculation unit 11 uses the phase difference information acquired for all the pixels of the image sensor 23 to calculate information about the distance to the target corresponding to each of the plurality of pixels.

Next, in step S22, the three-dimensional coordinate conversion unit 13 converts the distance information calculated for all the pixels of the image sensor 23 into three-dimensional coordinates (X, Y, Z) in orthogonal coordinate format, on the basis of the angle information for each pixel acquired by the angle information acquisition unit 12.

Next, in step S23, the coordinate rotation calculation unit 16 rotates the three-dimensional coordinates corresponding to all the pixels by a specific angle θ around the three axes of X, Y, and Z, and calculates the rotary coordinates (Xr, Yr, Zr).

Next, in step S24, all of the pixels of the image sensor 23 are set to i=0 and j=0 in order to confirm one by one whether or not a pixel has distance information to be outputted, for example, in order to start from the lower left end out of all the pixels of the image sensor 23.

Next, in step S25, the Z axis coordinate value Zr after rotation of a pixel (i, j) is compared with the installation height h, and the coordinates (Xr, Yr, Zr) of any pixel for which it is determined that the difference is greater than a specific threshold value S1, S2, or S3 set according to the target 30 to be detected are stored as the selection target.

Since the processing in step S25 varies with the type of the target 30, the details of the processing will be described below.

Next, in step S26, assuming that i=i+1, it is confirmed whether or not the adjacent pixels have distance information to be outputted.

Next, in step S27, it is determined whether or not the condition of i<Max_i is satisfied. That is, in step S27, it is confirmed whether or not the pixels of the image sensor 23 have been verified from end to end in the lateral direction.

Here, if it is determined that the end (MAX) in the lateral direction has not yet been verified, the processing goes back to step S25 and verification is performed as to whether or not the pixel has distance information to be outputted. On the other hand, if it is determined that the end (MAX) in the lateral direction has been verified, the processing proceeds to step S28.

Next, in step S28, since it was determined in step S27 that the pixel at the maximum position (end) in the lateral direction was verified, the setting is changed to i=0 and j=j+1 in order to move to the next higher row of pixels.

Next, in step S29, it is determined whether or not the condition of j<Max_j is satisfied. That is, in step S29, it is confirmed whether or not the pixels of the image sensor 23 have been verified from end to end in the vertical direction.

Here, if it is determined that the end (MAX) in the vertical direction has not yet been verified, the process goes back to step S25 and verification is performed as to whether or not the pixel has distance information to be outputted. On the other hand, if it is determined that the end (MAX) in the vertical direction has been verified, the processing proceeds to step S30.

Next, in step S30, since the verification has been completed for all the pixels of the image sensor 23, the coordinates (Xr, Yr, Zr) corresponding to the selected pixels are outputted on the basis of the verification result in step S25.

Consequently, if only distance information corresponding to pixels where the target 30 is detected is selected and outputted, this avoids the output of unnecessary information such as distance information for all of the pixels corresponding to the positions of the floor surface without any target 30, so the quantity of data that is outputted can be greatly reduced.

When the Detection Target is the Target 30

Here, the processing in step S25 of FIG. 13 described above, to verify whether or not each pixel of the image sensor 23 has distance information to be outputted, and in particular processing when the target 30 is an object that has been placed on the floor surface FL, will be described in detail with reference to FIG. 14.

That is, in step S31, the coordinate Zr value corresponding to the vertical direction of the orthogonal coordinate rotation system of the target pixel (i, j) is subtracted from the height h from the floor surface FL found by the calibration processing shown in FIG. 12, to calculate (h−Zr).

Next, in step S32, it is determined whether or not the result (h−Zr) of the subtraction processing in step S31 is greater than a specific threshold value S1 set by the threshold value setting unit 17, in order to determine the presence or absence of the target 30 placed on the floor surface FL.

Here, if it is determined that the result of the subtraction processing (h−Zr) is greater than the threshold value S1, it is recognized that the target 30 included in the target pixels is an object whose height dimension from the floor surface FL is at or above the threshold value, and the processing proceeds to step S33.

On the other hand, if it is determined that the result of the subtraction processing (h−Zr) is less than the threshold value S1, it is recognized that the target 30 included in the target pixels is an object with almost no height dimension from the floor surface FL, and the processing proceeds to step S35.

Next, in step S33, since the target 30 included in the target pixels was recognized as an object whose height dimension from the floor surface FL was at or above the threshold value in step S32, the target detection unit 18 determines that the target 30 is on the floor surface FL.

Next, in step S34, the output information selection unit 19 selects, as the output target, the coordinates (Xr, Yr, Zr) of a target pixel (i, j) determined to have the target 30, and the target ID (01) thereof.

Next, in step S35, since it was recognized in step S32 that the target 30 included in the target pixel is the floor surface FL or an object having almost no height dimension from the floor surface FL, it is determined that there is no object at the position on the floor surface FL corresponding to that pixel, and the processing proceeds to step S26.

Consequently, whether or not the target pixel includes the target 30 placed on the floor surface FL can be easily determined by using the threshold value S1 set for determining the presence or absence of an object (the target 30) placed on the floor surface FL.

When the Detection Target is the Hole 130*a*

Here, the processing in step S25 of FIG. 13 described above, to verify whether or not each pixel of the image sensor 23 has distance information to be outputted, and in particular processing when the target 30 is a hole 130*a* formed in the floor surface FL (see FIG. 10), will be described in detail with reference to FIG. 15.

That is, in step S41, the coordinate Zr value corresponding to the vertical direction of the orthogonal coordinate rotation system of the target pixel (i, j) is subtracted from the height h from the floor surface FL found by the calibration processing shown in FIG. 12, to calculated (h−Zr).

Next, in step S42, is determined whether or not the result (h−Zr) of the subtraction processing in step S41 is less than a specific threshold value S2 set by the threshold value

| setting unit 17, in order to determine the presence or absence of the hole 130*a* formed in the floor surface FL.

That is, when the target is the hole 130*a*, the distance information about the corresponding pixel acquired by the distance measuring device 20 will be greater than the installation height h from the floor surface FL. Consequently, it is determined here whether or not the value of (h−Zr) is below the threshold value S2 set for determination, taking into account that the value of (h−Zr) is a negative value in a pixel corresponding to the hole 130*a*.

Here, if it is determined that the result of the subtraction process (h−Zr) is below the threshold value S2, it is recognized that the target 30 included in the target pixel is the hole 130*a* located below the floor surface FL, and the processing proceeds to step S43.

On the other hand, if it is determined that the result of the subtraction processing (h−Zr) is above the threshold value S2, it is recognized that the target 30 included in the target pixel is the floor surface FL or an object having almost no depth dimension from the floor surface FL, and the processing proceeds to step S45.

Next, in step S43, since it was determined in step S42 that the height dimension of the target 30 included in the target pixel from the floor surface FL was below the threshold value S2, the target detection unit 18 determines that there is hole 130*a* in the floor surface FL.

Next, in step S44, the output information selection unit 19 selects, as the target output, the coordinates (Xr, Yr, Zr) of a target pixel (i, j) determined to have the hole 130*a*, and the target ID (02) thereof.

Next, in step S45, since it was recognized in step S42 that the target included in the target pixel was the floor surface FL or an object having almost no depth dimension from the floor surface FL, it is determined that there is no hole 130*a* at the position on the floor surface FL corresponding to the pixel, and the processing proceeds to step S26.

Consequently, it can be easily determined whether or not the target pixel includes the hole 130*a* formed in the floor surface FL by using the threshold value S2 set for determining the presence or absence of the hole 130*a* in the floor surface FL.

When the Detection Target is the Slope 130*b*

Here, the processing in step S25 of FIG. 13 described above, to verify whether or not each pixel of the image sensor 23 has distance information to be outputted, and in particular processing when the target 30 is the slope 130*b* on the floor surface FL (see FIG. 11), will be described in detail with reference to FIG. 16.

That is, in step SM, in order to determine the presence or absence of the slope 130*b* whose dimension changes in the height direction, the amount of change $\Delta Zr/\Delta Xr$ is calculated for Zr at a certain pixel position (i, j) and a pixel position (i−1, j) adjacent to this on the negative side in the lateral direction. Furthermore, the amount of change $\Delta Zr/\Delta Yr$ is calculated Zr at a certain pixel position (i, j) and the pixel position (i, j−1) adjacent to this on the negative side in the vertical direction.

Next, in step S52, it is determined whether or not the sum of $\Delta Zr/\Delta Xr$ and $\Delta Zr/\Delta Yr$ calculated in step SM is greater than a specific threshold value S3 set by the threshold value setting unit 17, that is, whether or not the conditional expression $\{(\Delta Zr/\Delta Xr)+(\Delta Zr/\Delta Yr)\}>$threshold value S3 is satisfied, in order to determine the presence or absence of the slope 130*b* on the floor surface FL.

That is, if the target is the slope 130*b*, the fact that the amount of change in the height direction with pixels adjacent in the horizontal direction and the vertical direction is greater than or equal to a specific value is taken into account, and it is determined whether or not the sum of the change amount in the vertical and horizontal directions greater than the threshold value S3 set for the purpose of determination.

Here, if it is determined that the determination result is greater than the threshold value S3, it is recognized that the target 30 included in the target pixel may be the slope 130*b*, and the processing proceeds to step S53.

On the other hand, if it is determined that the determination result is less than the threshold value S3, it is recognized that the target pixel does not include the slope 130*b*, and the processing proceeds to step S57.

Next, in step S53, the amount of change $\Delta Zr/\Delta Xr$ is calculated for Zr at a certain pixel position (i, j) and a pixel position (i+1, j) adjacent to this in the lateral direction. Furthermore, the amount of change $\Delta Zr/\Delta Yr$ is calculated for Zr at a certain pixel position (i, j) and the pixel position (i, j+1) adjacent to this in the vertical direction.

Next, in step S54, it is determined whether or not the sum of $\Delta Zr/\Delta Xr$ and $\Delta Zr/\Delta Yr$ calculated in step S53 is greater than the threshold value S3, that is, whether or not the conditional expression $\{(\Delta Zr/\Delta Xr)+(\Delta Zr/\Delta Yr)\}>$S3 is satisfied.

Here, if it is determined that the determination result is greater than the threshold value S3, the target 30 included in the target pixel is recognized to be the slope 130*b*, and the processing proceeds to step S55.

On the other hand, if it is determined that the determination result is less than the threshold value S3, it is recognized that the target pixel does not include the slope 130*b*, and the processing proceeds to step S57.

Next, in step S55, since it was determined in step S54 that the sum of $\Delta Zr/\Delta Xr$ and $\Delta Zr/\Delta Yr$ was greater than the threshold value S3, the target detection unit 18 determines that the floor surface FL has the slope 130*b*.

Next, in step S56, the output information selection unit 19 selects, as the output target, the coordinates (Xr, Yr, Zr) of a target pixel (i, j) determined to have the slope 130*b*, and the target ID (03).

Next, in step S57, since it was determined in step S54 that the sum of $\Delta Zr/\Delta Xr$ and $\Delta Zr/\Delta Yr$ was less than the threshold value S3, it is recognized that there is almost no change in the dimension of the target in the height direction between adjacent pixels, so it is determined that there is no slope on the floor surface, and the processing proceeds to step S26.

Consequently, the threshold value S3 set for determining the presence or absence of the slope 130*b* on the floor surface FL can be used to easily determine whether or not the target pixel includes the slope 130*b* placed on the floor surface FL.

Floor Surface FL State Detection Processing

As discussed above, the distance measuring device 20 of this embodiment uses distance information to determine whether or not all the pixels included in the image sensor 23 include a target (object, hole, slope, etc.), which makes it possible to select and output only the distance information had by the target pixels including the target.

Figure 14:
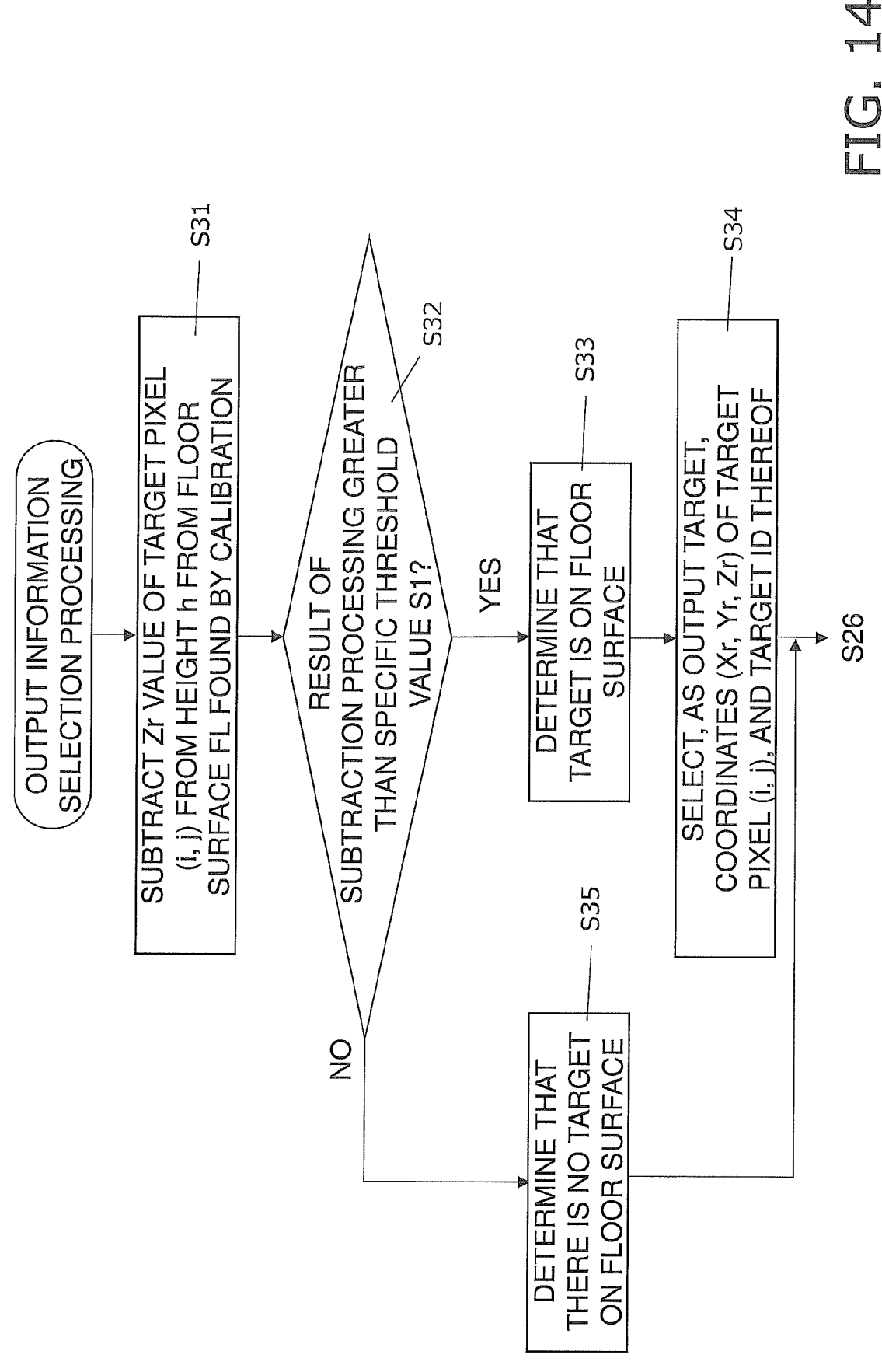
FIG. 14 is a flowchart illustrating in detail the flow of detection of a target (object) placed on a floor surface in the processing of step S25 of FIG. 13.
Figure 15:
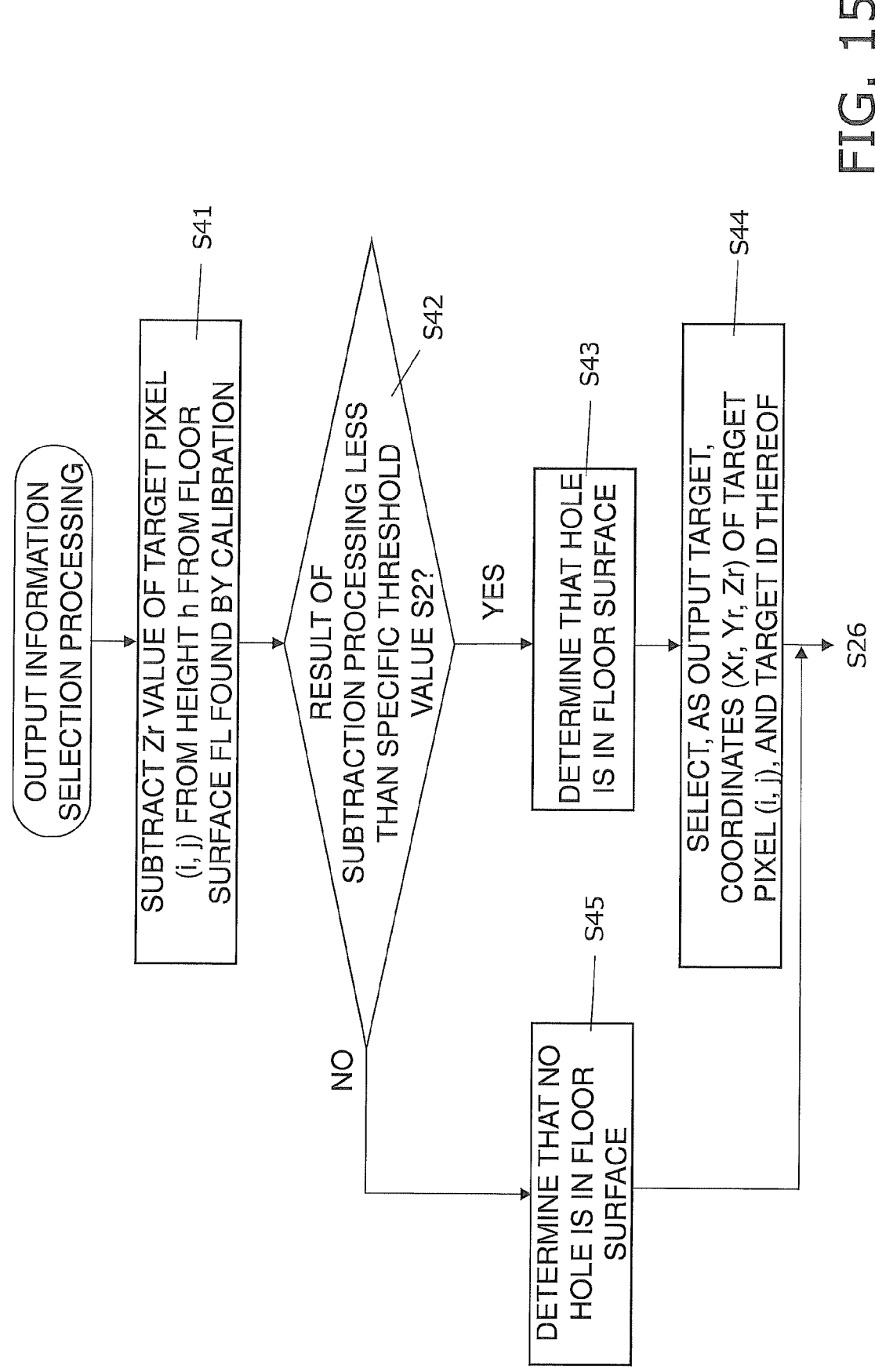
FIG. 15 is a flowchart of the detection of a hole in the floor surface in FIG. 10 in the processing of step S25 in FIG. 13.

The distance measuring device 20 of this embodiment can also detect the state of the floor surface FL by continuously implementing the flowcharts of FIGS. 14 to 16.

More specifically, regarding the processing of step S25 in FIG. 13, by continuously executing the flowcharts shown in FIGS. 14 to 16, the three threshold values S1, S2, and S3 can be used to detect the presence or absence of an object, the presence or absence of a hole, the presence or absence of a slope, and the like as the state of the floor surface FL.

Therefore, first, determination processing is performed using the threshold value S1 according to the flowchart shown in FIG. 14, and if an object having a height dimension is detected on the floor surface FL, it is determined that a target 30 has been placed on the floor surface FL, and no object is detected, determination processing is performed according to the flowchart shown in FIG. 15.

Then, determination processing is performed using the threshold value S2 according to the flowchart shown in FIG. 15, and if a hole 130a having a depth dimension is detected in the floor surface FL, it is determined that there is a hole 130a formed in the floor surface FL, but if the hole 130a is not detected, determination processing is performed according to the flowchart shown in FIG. 16.

Finally, determination processing is performed using the threshold value S3 according to the flowchart shown in FIG. 16, and if the slope 130b is detected on the floor surface FL, it is determined that the slope 130b is on the floor surface FL, but if the slope 130b is not detected, the state detection processing of the floor surface FL is ended and the processing proceeds to step S26.

Consequently, if determination processing is performed using the different threshold values S1, S2, and S3, then even when the distance measuring device 20 is mounted on a transport device capable of traveling over the floor surface FL, the presence or absence of irregularities such as the hole 130a in the floor surface FL, the presence or absence of obstacles, and so forth can be accurately determined, and the transport work can be carried out smoothly.

Other Embodiments

An embodiment of the present invention was described above, but the present invention is not limited to or by the above embodiment, and various modifications are possible without departing from the gist of the invention.

(A)

In the above embodiment, an example was given in which the present invention was realized as a floor surface condition detection device and a floor surface condition detection method. However, the present invention is not limited to this.

For instance, the present invention may be realized as an floor surface condition detection program that causes a computer to execute the floor surface condition detection method of the floor surface condition detection device described above.

This program is stored in a memory (memory unit) installed in a floor surface condition detection device, and the CPU reads the floor surface condition detection program stored in the memory and causes the hardware to execute each step. More specifically, the same effect as what was described above can be obtained if the CPU reads the floor surface condition detection program and executes the above-mentioned distance information acquisition step and output information selection step.

Also, the present invention may be realized as a recording medium on which the floor surface condition detection program of the floor surface condition detection device is stored.

(B)

In the above embodiment, an example was given in which the distance information acquisition unit was the distance calculation unit 11 that calculated distance information corresponding to each pixel of the distance image by TOF method. However, the present invention is not limited to this.

For instance, the configuration may be such that distance information corresponding to each pixel of the distance image obtained by TOF method is acquired from an external distance measuring device.

That is, the configuration may be such that the floor surface condition detection device of the present invention is provided separately from the distance measuring device, distance information is acquired from the distance measuring device, and distance information corresponding to the pixels to be outputted is selected and outputted.

(C)

In the above embodiment, an example was given in which the mounting angle θ of the distance measuring device 20 was calculated. However, the present invention is not limited to this.

For instance, if the mounting angle of the distance measuring device is known in advance, the mounting height and the like may be found by using this mounting angle θ.

(D)

In the above embodiment, an example was given in which the reflected light of the light emitted from the lighting device 21 toward a target was detected, and the distance to the target was measured. However, the present invention is not limited to this.

For instance, the configuration may be such that instead of light in a broad sense (ultraviolet light, visible light, and infrared light), the target is irradiated with y (gamma) rays and X-rays which have a shorter wavelength than light, microwaves which have a longer wavelength than light, broadcast radio waves (short wave, medium wave, long wave), ultrasonic waves, elastic waves, quantum waves, or the like.

That is, the light that irradiates the target may be some other type of electromagnetic waves having a property such that the reflected amount is attenuated in inverse proportion to the square of the distance.

(E)

In the above embodiment, an example was given in which the target detected using distance information was an object placed on the floor surface FL, the hole 130a, or the slope 130b. However, the present invention is not limited to this.

For instance, the detectable object may be some object other than what was mentioned above.

In this case, the presence or absence of each object can be detected by using a threshold value set according to the form, size, shape, and the like of each object.

INDUSTRIAL APPLICABILITY

Since the distance measuring device of the present invention has the effect of reducing the quantity of data in information including outputted distance information, this device is broadly applicable to distance measuring devices such as TOF sensors, for example.

The invention claimed is:

1. A floor surface condition detection device configured to detect a condition of a floor surface on which a target has been placed, the device comprising:

a lighting device;

a light receiving unit comprising an image sensor; and a processor operatively coupled to the lighting device and the image sensor, the processor configured with a program to perform operations comprising:

operation as a distance information acquisition unit configured to acquire information about a distance to the target according to an amount of reflection of electromagnetic waves emitted from the lighting device toward the target and received by the image sensor;

operation as a condition detection unit configured to detect the condition of the floor surface on which the target has been placed on the basis of the information about the distance acquired by the distance information acquisition unit;

operation as an angle information acquisition unit configured to acquire angle information corresponding to each pixel included in the distance image;

operation as a three dimensional coordinate conversion unit configured to convert the information about the distance acquired by the distance information acquisition unit into three dimensional coordinates on the basis of the angle information acquired by the angle information acquisition unit;

operation as a plane detection unit configured to detect a floor surface on which the target has been placed;

operation as a height calculation unit configured to calculate an installation height (h) of a distance measuring device on the basis of the three dimensional coordinates converted by the three dimensional coordinate conversion unit from the information about the distance for the floor surface detected by the plane detection unit;

operation as a coordinate rotation calculation unit configured to calculate a rotary coordinates (Xr, Yr, Zr) obtained by rotating around an axis the three dimensional coordinates converted from the information about the distance and the angle information in the three dimensional coordinate conversion unit;

operation as an irregularity detection unit configured to compare the coordinate (Zr) in a height direction of the rotary coordinates (Xr, Yr, Zr) calculated by the coordinate rotation calculation unit with the installation height (h) calculated by the height calculation unit, and if an object having a positive or negative dimension in the height direction is detected, detects this object as an irregularity of the floor surface; and operation as a threshold value setting unit configured to set a first threshold value, a second threshold value, and a third threshold value used in the detection of irregularities by the irregularity detection unit, wherein the height calculation unit calculates, as the installation height, an average value of coordinate values in an optical axis direction from among the plurality of coordinate values re-acquired by rotating an orthogonal coordinate system of the distance measuring device around an axis by the angle formed by a vertical line of the floor surface detected by the plane detection unit and the optical axis of the distance measuring device, and the irregularity detection unit determines that there is the object on the floor when the difference (h−Zr) between the installation height (h) and the coordinate (Zr) is at or above the first threshold value, and that there is a hole on the floor when the difference (h−Zr) is below the second threshold value, and that there is a slope on the floor when an amount of change (ΔZr/ΔXr+ΔZr/ΔYr) of the distance in the height direction from the floor between adjacent pixels is above the third threshold value.

2. The floor surface condition detection device according to claim 1, wherein the processor is configured with the program to perform operations further comprising operation as an output information selection unit configured to select and outputs the information about the distance for each pixel including the irregularities detected by the condition detection unit.

3. A distance measuring device, comprising:

the floor surface condition detection device according to claim 1, wherein, the lighting device is configured to irradiate the target with electromagnetic waves; and the sensor of the light receiving unit is configured to sense the amount of reflection of the electromagnetic wave emitted from the lighting device.

4. The distance measuring device according to claim 3, further comprising a memory unit configured to store at least one of the following: the information about the distance, angle information corresponding to each pixel included in the distance image, an orthogonal coordinate system of the distance measuring device, the installation height, rotary coordinates obtained by rotating around an axis the three-dimensional coordinates converted from the information about the distance and the angle information, a threshold used when detecting the target, and coordinate values of pixels to be outputted.

5. The distance measuring device according to claim 3, wherein the processor is configured with the program to perform operations further comprising operation as an output unit configured to output to an external device the information about the distance corresponding to the pixels.

6. A floor surface condition detection method for detecting the condition of a floor surface on which an object has been placed with a device comprising a lighting device and an image sensor, the method comprising:

emitting from the lighting device, electromagnetic waves toward the target;

acquiring information about the distance to the target according to the amount of reflection of the electromagnetic waves emitted from the lighting device toward the target and received by the image sensor;

detecting the condition of the floor surface on which the target has been placed on the basis of the acquired information about the distance;

acquiring angle information corresponding to each pixel included in the distance image;

converting the information about the acquired distance into three dimensional coordinates on the basis of the acquired angle information;

detecting a floor surface on which the target has been placed;

calculating an installation height (h) of a distance measuring device on the basis of the converted three dimensional coordinates from information about a distance to the detected floor surface;

calculating a rotary coordinates (Xr, Yr, Zr) obtained by rotating around an axis the three dimensional coordinates converted from the information about the distance and the acquired angle information;

comparing the coordinate (Zr) in a height direction of the calculated rotary coordinates (Xr, Yr, Zr) with the calculated installation height (h), and if an object having a positive or negative dimension in the height direction is detected, detects this object as an irregularity of the floor surface; and setting a first threshold value, a second threshold value, and a third threshold value used in the detection of irregularities, wherein calculating the installation height comprises calculating, as the installation height (h), an average value of coordinate values in an optical axis direction from among the plurality of coordinate values re-acquired by rotating an orthogonal coordinate system of the distance measuring device around an axis by the angle formed by a vertical line of the detected floor surface and the optical axis of the distance measuring device, and comparing the coordinate (Zr) in a height direction comprises determining that there is the object on the floor when the difference (h−Zr) between the installation height (h) and the coordinate (Zr) is at or above the first threshold value, and that there is a hole on the floor when the difference (h−Zr) is below the second threshold value, and that there is a slope on the floor when an amount of change (ΔZr/ΔXr+ΔZr/ΔYr) of the distance in the height direction from the floor between adjacent pixels is above the third threshold value.

7. A non-transitory computer readable medium storing a floor surface condition detection program for detecting the condition of a floor surface on which a target has been placed with a device comprising a lighting device and an image sensor, wherein the program when read and executed causes a computer to execute a floor surface condition detection method comprising:

emitting from the lighting device, electromagnetic waves toward the target;

acquiring information about the distance to the target according to the amount of reflection of the electromagnetic waves emitted from the lighting device toward the target and received by the image sensor; and detecting the condition of the floor surface on which the target has been placed on the basis of the information about the acquired distance information about the distance;

acquiring angle information corresponding to each pixel included in the distance image;

converting the information about the acquired distance into three dimensional coordinates on the basis of the acquired angle information;

detecting a floor surface on which the target has been placed;

calculating an installation height (h) of a distance measuring device on the basis of the converted three dimensional coordinates from information about a distance to the detected floor surface;

calculating a rotary coordinates (Xr, Yr, Zr) obtained by rotating around an axis the three dimensional coordinates converted from the information about the distance and the acquired angle information;

comparing the coordinate (Zr) in a height direction of the calculated rotary coordinates (Xr, Yr, Zr) with the calculated installation height (h), and if an object having a positive or negative dimension in the height direction is detected, detects this object as an irregularity of the floor surface; and setting a first threshold value, a second threshold value, and a third threshold value used in the detection of irregularities, wherein calculating the installation height comprises calculating, as the installation height (h), an average value of coordinate values in an optical axis direction from among the plurality of coordinate values re-acquired by rotating an orthogonal coordinate system of the distance measuring device around an axis by the angle formed by a vertical line of the detected floor surface and the optical axis of the distance measuring device, and comparing the coordinate (Zr) in a height direction comprises determining that there is the object on the floor when the difference (h−Zr) between the installation height (h) and the coordinate (Zr) is at or above the first threshold value, and that there is a hole on the floor when the difference (h−Zr) is below the second threshold value, and that there is a slope on the floor when an amount of change (ΔZr/ΔXr+ΔZr/ΔYr) of the distance in the height direction from the floor between adjacent pixels is above the third threshold value.

* * * * *